United States Patent
Take et al.

(10) Patent No.: US 8,807,854 B2
(45) Date of Patent: Aug. 19, 2014

(54) CAMERA SYSTEM, INTERCHANGEABLE LENS AND METHOD OF MANUFACTURING INTERCHANGEABLE LENS

(71) Applicant: Nikon Corporation, Tokyo (JP)

(72) Inventors: Toshinori Take, Yokohama (JP);
Masanori Hasuda, Fujisawa (JP);
Noriyasu Kotani, Tokyo (JP); Hideaki Hoshikawa, Koshigaya (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/958,249

(22) Filed: Aug. 2, 2013

(65) Prior Publication Data
US 2013/0314590 A1 Nov. 28, 2013

Related U.S. Application Data

(63) Continuation of application No. 13/253,621, filed on Oct. 5, 2011, now abandoned.

(30) Foreign Application Priority Data

Oct. 6, 2010 (JP) .................................. 2010-226549
Sep. 15, 2011 (JP) .................................. 2011-202391

(51) Int. Cl.
*G03B 17/00* (2006.01)

(52) U.S. Cl.
USPC .......................................................... 396/529

(58) Field of Classification Search
USPC .......................................................... 396/529
See application file for complete search history.

(56) References Cited

U.S. PATENT DOCUMENTS

| | | | |
|---|---|---|---|
| 5,583,593 A | 12/1996 | Terada | |
| 5,786,944 A | 7/1998 | Hagimori et al. | |
| 5,850,577 A | 12/1998 | Ito | |
| 6,807,015 B2 | 10/2004 | Eguchi et al. | |
| 6,910,814 B2 | 6/2005 | Kawai et al. | |
| 7,118,295 B2 | 10/2006 | Koyama et al. | |
| 7,435,020 B2 | 10/2008 | Kawai et al. | |
| 7,898,594 B2 | 3/2011 | Inaba | |
| 8,218,066 B2 | 7/2012 | Tsukatani et al. | |
| 8,233,052 B2 | 7/2012 | Augusto | |

(Continued)

FOREIGN PATENT DOCUMENTS

| | | |
|---|---|---|
| JP | 04-042206 A | 2/1992 |
| JP | 07-225338 A | 8/1995 |

(Continued)

OTHER PUBLICATIONS

Office Action (Notification of Reasons for Refusal) dated Jun. 3, 2014 in Japanese Patent Application No. 2011-202391.

*Primary Examiner* — Rodney Fuller
(74) *Attorney, Agent, or Firm* — Mitchell W. Shapiro

(57) ABSTRACT

A camera system having a predetermined image circle, comprises: an interchangeable lens having a lens mount portion; and a camera body having an image sensor that is disposed within that image circle, and a body mount portion, wherein, when a radius of circular portion at a maximum internal diameter part of an opening portion of the lens mount portion is termed rM, a flange back that is a distance from the lens mount portion to a light reception surface of an image sensor in a state that the interchangeable lens and the camera body are mutually engaged is termed da, and the diameter of the image circle is termed D, the following equations are satisfied:

| | |
|---|---|
| 14.0 mm≤2rM≤40.0 mm | Conditional Expression #1 |
| 16.0 mm≤da≤20.0 mm | Conditional Expression #2 |
| 14.0 mm≤D≤20.0 mm | Conditional Expression #3. |

8 Claims, 7 Drawing Sheets

(56) References Cited

U.S. PATENT DOCUMENTS

| | | |
|---|---|---|
| 2002/0171750 A1 | 11/2002 | Kato |
| 2004/0175167 A1 | 9/2004 | Takato |
| 2007/0217785 A1 | 9/2007 | Fujiwara et al. |
| 2008/0117326 A1 | 5/2008 | Nishio |
| 2011/0273609 A1 | 11/2011 | DiFrancesco et al. |
| 2012/0013997 A1 | 1/2012 | Yamanaka |
| 2012/0070141 A1 | 3/2012 | Scholz et al. |

FOREIGN PATENT DOCUMENTS

| | | |
|---|---|---|
| JP | 08-062487 A | 3/1996 |
| JP | 08-086961 A | 4/1996 |
| JP | 09-021952 A | 1/1997 |
| JP | 09-159918 A | 6/1997 |
| JP | 09-269448 A | 10/1997 |
| JP | 10-020193 A | 1/1998 |
| JP | 11-202195 A | 7/1999 |
| JP | 11-295600 A | 10/1999 |
| JP | 2000-171700 A | 6/2000 |
| JP | 2000-193911 A | 7/2000 |
| JP | 2001-042214 A | 2/2001 |
| JP | 2001-281522 A | 10/2001 |
| JP | 2003-015016 A | 1/2003 |
| JP | 2003-255210 A | 9/2003 |
| JP | 2003-287681 A | 10/2003 |
| JP | 2004-170883 A | 6/2004 |
| JP | 2004-177628 A | 6/2004 |
| JP | 2005-006122 A | 1/2005 |
| JP | 2006-053218 A | 2/2006 |
| JP | 2007-241103 A | 9/2007 |
| JP | 2008-051894 A | 3/2008 |
| JP | 2008-129454 A | 6/2008 |
| JP | 2008-275666 A | 11/2008 |
| JP | 2009-201008 A | 9/2009 |

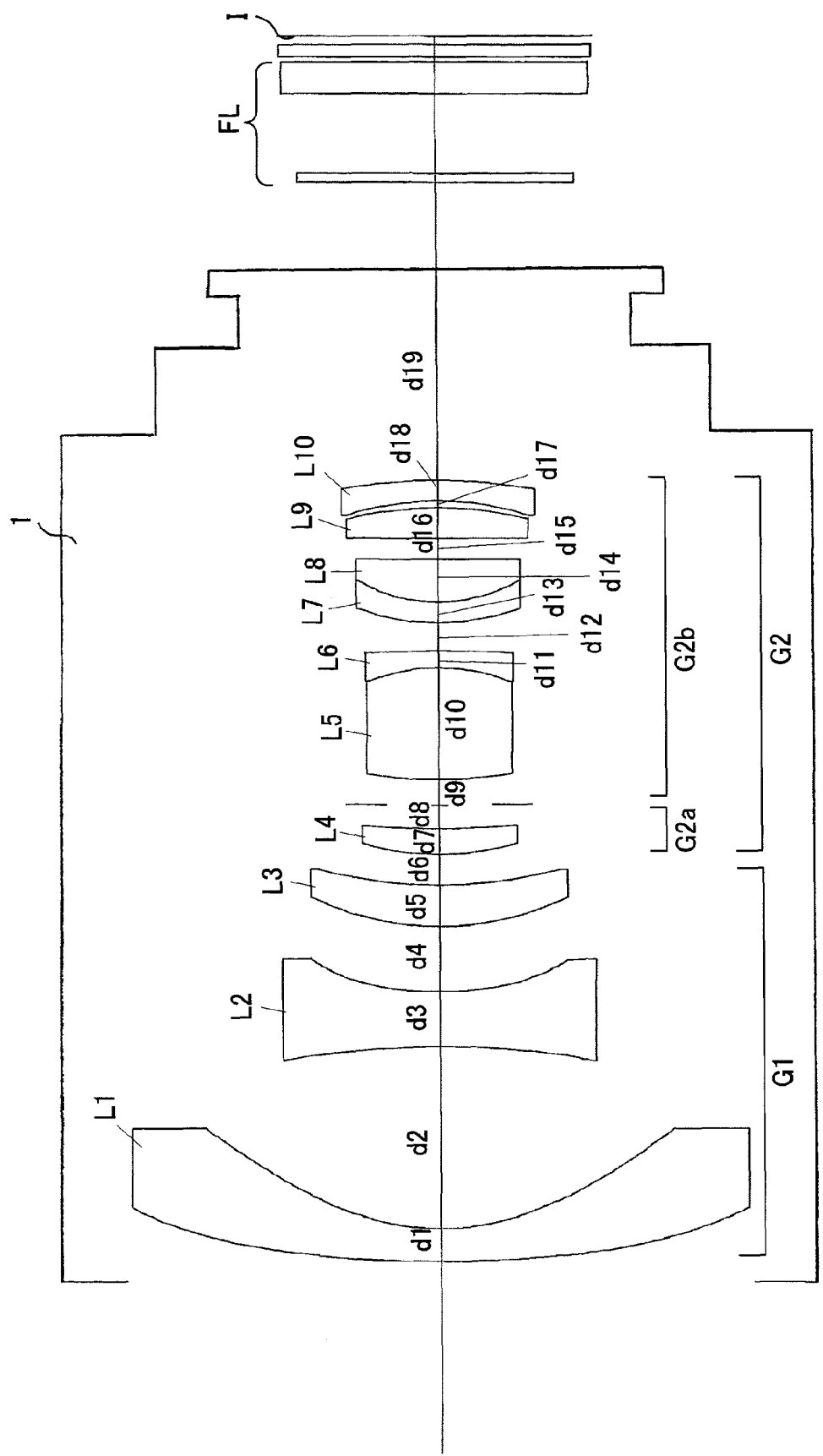

CAMERA SYSTEM, INTERCHANGEABLE LENS AND METHOD OF MANUFACTURING INTERCHANGEABLE LENS

INCORPORATION BY REFERENCE

The disclosure of the following priority application is herein incorporated by reference: Japanese Patent Application No. 2010-226549 and Japanese Patent Application No. 2011-202391 filed Sep. 15, 2011.

BACKGROUND OF THE INVENTION

1. Field of the Invention

The present invention relates to a camera system that includes a camera body and an interchangeable lens, interchangeable lens and a method of manufacturing an interchangeable lens.

2. Description of Related Art

From the past, with digital cameras and video cameras and so on, camera systems and interchangeable lenses have been per se known that include mounts on the lens side and on the camera body side, and with which the lenses can be interchanged (for example, refer to Japanese Laid-Open Patent Publication 2005-6122).

SUMMARY OF THE INVENTION

However, with prior art camera systems and interchangeable lens, the image circle is large, and there has been the problem that the entire camera system cannot be made sufficiently compact.

The present invention has been conceived in consideration of the problem described above, and its object is to provide a camera system and an interchangeable lens with which it is possible to obtain the desired optical performance in a compact and thin form.

According to the first aspect of the present invention, a camera system having a predetermined image circle, comprises: an interchangeable lens having a lens mount portion for attachment to a camera body and that is capable of forming an image within that image circle; and a camera body having an imaging element (image sensor) that is disposed within that image circle, and a body mount portion for attaching an interchangeable lens so that it is disposed at a position separated by a predetermined distance from a light reception surface of the imaging element (image sensor), wherein, when a radius of circular portion at a maximum internal diameter part of the opening portion of the lens mount portion is termed rM, a flange back that is a distance from the lens mount portion to a light reception surface of an imaging element (image sensor) in a state that an interchangeable lens and a camera body are mutually engaged is termed da, and the diameter of the image circle is termed D, the following equations are satisfied:

$14.0 \text{ mm} \le 2rM \le 40.0 \text{ mm}$    Conditional Expression #1

$16.0 \text{ mm} \le da \le 20.0 \text{ mm}$    Conditional Expression #2

$14.0 \text{ mm} \le D \le 20.0 \text{ mm}$    Conditional Expression #3.

According to the second aspect of the present invention, in the camera system of the first aspect, it is preferred that, when a distance upon the optical axis from the lens mount portion to the lens surface closest to the image is termed L (in case the lens mount portion is taken as a reference, the direction towards the image being considered positive and the direction towards the object to be photographed being considered negative), the following equations are satisfied:

$L \le 11.0 \text{ mm}$    Conditional Expression #4.

According to the third aspect of the present invention, in the camera system of the first or the second aspect, it is preferred that, when the maximum internal diameter part of the opening portion of the lens mount portion is termed rM, the following equation is satisfied:

$18.0 \text{ mm} \le 2rM \le 34.0 \text{ mm}$    Conditional Expression #1A.

According to the fourth aspect of the present invention, in the camera system of any one of the first through the third aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical system of the interchangeable lens is termed F-number, the following equation is satisfied:

$2rM/da \ge 1/F\text{-number}$    Conditional Expression #5.

According to the fifth aspect of the present invention, in the camera system of any one of the first through the third aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical system of the interchangeable lens is termed F-number, the following equations are satisfied:

$2rM/da \ge 1/F\text{-number}$    Conditional Expression #5

$2rM/da \ge 0.7$    Conditional Expression #6.

According to the sixth aspect of the present invention, in the camera system of any one of the first through the third aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical system of the interchangeable lens is termed F-number, the following equations are satisfied:

$2rM/da \ge 1/F\text{-number}$    Conditional Expression #5

$2rM/da \ge 0.8$    Conditional Expression #6A.

According to the seventh aspect of the present invention, in the camera system of any one of the first through the third aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical of the interchangeable lens to the camera body is termed F-number, the following equations are satisfied:

$2rM/da \ge 1/F\text{-number}$    Conditional Expression #5

$2rM/da \ge 1.0$    Conditional Expression #6B.

According to the eighth aspect of the present invention, an interchangeable lens comprises a lens mount portion for attachment to a camera body; and an optical system for focusing an object image on a light reception plane of the imaging element (image sensor); wherein, the interchangeable lens is capable to be attached to the camera body that has a camera body mount portion and an imaging element (image sensor) whose whole pixels generate imaging signals can fit inside of a circle having a diameter in a range from 14.0 mm to 20.0 mm, and, when a maximum internal diameter part of an opening portion of the lens mount portion is termed rM and a flange back that is a distance upon the optical axis from the body mount portion to the light reception surface of the imaging element (image sensor) in a state that the interchangeable lens and the camera body are mutually engaged is termed da, the following equation is satisfied:

$14.0\text{ mm} \leq 2rM \leq 40.0\text{ mm}$  Conditional Expression #1

$16.0\text{ mm} \leq da \leq 20.0\text{ mm}$  Conditional Expression #2.

According to the ninth aspect of the present invention, in the interchangeable lens of the eighth aspect, it is preferred that, when a distance upon the optical axis from the lens mount portion to the lens surface closest to the image is termed L (in case the lens mount portion is taken as a reference, the direction towards the image being considered positive and the direction towards the object to be photographed being considered negative), the following equations are satisfied:

$L \leq 11.0\text{ mm}$  Conditional Expression #4.

According to the tenth aspect of the present invention, in the interchangeable lens of the eighth or the ninth aspect, it is preferred that, when the maximum internal diameter part of the opening portion of the lens mount portion is termed rM, the following equation is satisfied:

$18.0\text{ mm} \leq 2rM \leq 34.0\text{ mm}$  Conditional Expression #1A.

According to the eleventh aspect of the present invention, in the interchangeable lens of any one of the eighth through the tenth aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical system of the interchangeable lens is termed F-number, the following equation is satisfied:

$2rM/da \geq 1/F\text{-number}$  Conditional Expression #5.

According to the twelfth aspect of the present invention, in the interchangeable lens of any one of the eighth through the tenth aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical system of the interchangeable lens is termed F-number, the following equations are satisfied:

$2rM/da \geq 1/F\text{-number}$  Conditional Expression #5

$2rM/da \geq 0.7$  Conditional Expression #6.

According to the thirteenth aspect of the present invention, in the interchangeable lens of any one of the eighth through the tenth aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical system of the interchangeable lens is termed F-number, the following equations are satisfied:

$2rM/da \geq 1/F\text{-number}$  Conditional Expression #5

$2rM/da \geq 0.8$  Conditional Expression #6A.

According to the fourteenth aspect of the present invention, in the interchangeable lens of any one of the eighth through the tenth aspect, it is preferred that, when the maximum internal diameter part of the opening portion of the lens mount portion is termed rM, the flange back that is the distance upon the optical axis from the body mount portion to the light reception surface of the imaging element (image sensor) in a state that the interchangeable lens and the camera body are mutually engaged is termed da, and the aperture ratio of the optical of the interchangeable lens to the camera body is termed F-number, the following equations are satisfied:

$2rM/da \geq 1/F\text{-number}$  Conditional Expression #5

$2rM/da \geq 1.0$  Conditional Expression #6B.

According to the fifteenth aspect of the present invention, an interchangeable lens comprises a lens mount portion for attachment to the camera body; and an optical system for focusing an object image on a light reception plane of the imaging element (image sensor); wherein, the interchangeable lens is capable to be attached to a camera body that has a camera body mount portion and an imaging element (image sensor) whose whole pixels generate imaging signals can fit inside of a circle having a diameter in a range from 14.0 mm to 20.0 mm, and, when a maximum internal diameter part of an opening portion of the lens mount portion is termed rM and a distance from the lens mount portion to an image surface of the optical system is termed dB, the following equation is satisfied:

$14.0\text{ mm} \leq 2rM \leq 40.0\text{ mm}$  Conditional Expression #1

$14.8\text{ mm} \leq dB \leq 18.8\text{ mm}$  Conditional Expression #2-2.

According to the sixteenth aspect of the present invention, in the interchangeable lens of the fifteenth aspect, it is preferred that, when a distance upon the optical axis from the lens mount portion to the lens surface closest to the image is termed L (in case the lens mount portion is taken as a reference, the direction towards the image being considered positive and the direction towards the object to be photographed being considered negative), the following equations are satisfied:

$L \leq 11.0\text{ mm}$  Conditional Expression #4.

According to the seventeenth aspect of the present invention, in the interchangeable lens of the fifteenth or the sixteenth aspect, it is preferred that, when the maximum internal diameter part of the opening portion of the lens mount portion is termed rM, the following equation is satisfied:

$18.0\text{ mm} \leq 2rM \leq 34.0\text{ mm}$  Conditional Expression #1A.

According to the eighteenth aspect of the present invention, in the interchangeable lens of any one of the fifteenth through the seventeenth aspect, it is preferred that, when the maximum internal diameter part of the opening portion of the lens mount portion is termed rM, the distance from the lens mount portion to the image surface of the optical system is termed dB, and the aperture ratio of the optical system of the interchangeable lens is termed F-number, the following equation is satisfied:

$2rM/dB \geq 1/F$-number  Conditional Expression #5-2.

According to the nineteenth aspect of the present invention, in the interchangeable lens of any one of the fifteenth through the seventeenth aspect, it is preferred that, when the maximum internal diameter part of the opening portion of the lens mount portion is termed rM, the distance from the lens mount portion to the image surface of the optical system is termed dB, and the aperture ratio of the optical system of the interchangeable lens is termed F-number, the following equations are satisfied:

$2rM/dB \geq 1/F$-number  Conditional Expression #5-2

$2rM/dB \geq 0.7$  Conditional Expression #6-2.

According to the twentieth aspect of the present invention, in the interchangeable lens of any one of the fifteenth through the seventeenth aspect, it is preferred that, when the maximum internal diameter part of the opening portion of the lens mount portion is termed rM, the distance from the lens mount portion to the image surface of the optical system is termed dB, and the aperture ratio of the optical system of the interchangeable lens is termed F-number, the following equations are satisfied:

$2rM/dB \geq 1/F$-number  Conditional Expression #5-2

$2rM/dB \geq 0.8$  Conditional Expression #6-2A.

According to the twenty-first aspect of the present invention, in the interchangeable lens of any one of the fifteenth through the seventeenth aspect, it is preferred that, when the maximum internal diameter part of the opening portion of the lens mount portion is termed rM, the distance from the lens mount portion to the image surface of the optical system is termed dB, and the aperture ratio of the optical of the interchangeable lens to the camera body is termed F-number, the following equations are satisfied:

$2rM/dB \geq 1/F$-number  Conditional Expression #5-2

$2rM/dB \geq 1.0$  Conditional Expression #6-2B.

According to the twenty-second aspect of the present invention, a method of manufacturing an interchangeable lens that is capable to be attached to the camera body that has a camera body mount portion and the image sensor whose whole pixels generate imaging signals can fit inside of a circle having a diameter in a range from 14.0 mm to 20.0 mm, comprises, when a maximum internal diameter part of an opening portion of the lens mount portion is termed rM and a flange back that is a distance upon the optical axis from the body mount portion to the light reception surface of the image sensor in a state that the interchangeable lens and the camera body are mutually engaged is termed da, forming a lens mount so as to be satisfied the following equations:

$14.0 \text{ mm} \leq 2rM \leq 40.0 \text{ mm}$  Conditional Expression #1

$16.0 \text{ mm} \leq da \leq 20.0 \text{ mm}$  Conditional Expression #2, and assembling the interchangeable lens by combining the lens mount with an optical system.

According to the twenty-third aspect of the present invention, in the method of manufacturing an interchangeable lens of the twenty-second aspect, it is preferred that, when the maximum internal diameter part of the opening portion of the lens mount portion is termed rM, forming a lens mount so as to be satisfied the following equation:

$18.0 \text{ mm} \leq 2rM \leq 34.0 \text{ mm}$  Conditional Expression #1A.

According to the twenty-fourth aspect of the present invention, in the method of manufacturing an interchangeable lens of the twenty-second aspect, it is preferred that, when the maximum internal diameter part of the opening portion of the lens mount portion is termed rM, forming a lens mount so as to be satisfied the following equation:

$18.0 \text{ mm} \leq 2rM \leq 34.0 \text{ mm}$  Conditional Expression #1A.

According to the twenty-fifth aspect of the present invention, in the method of manufacturing an interchangeable lens of the twenty-second aspect, it is preferred that, when the maximum internal diameter part of the opening portion of the lens mount portion is termed rM, the flange back that is the distance upon the optical axis from the body mount portion to the light reception surface of the image sensor in a state that the interchangeable lens and the camera body are mutually engaged is termed da, and the aperture ratio of the optical system of the interchangeable lens is termed F-number, forming a lens mount so as to be satisfied the following equation:

$2rM/da \geq 1/F$-number  Conditional Expression #5.

According to the twenty-sixth aspect of the present invention, in the method of manufacturing an interchangeable lens of the twenty-second aspect, it is preferred that, when the maximum internal diameter part of the opening portion of the lens mount portion is termed rM, the flange back that is the distance upon the optical axis from the body mount portion to the light reception surface of the image sensor in a state that the interchangeable lens and the camera body are mutually engaged is termed da, and the aperture ratio of the optical system of the interchangeable lens is termed F-number, forming a lens mount so as to be satisfied the following equations:

$2rM/da \geq 1/F$-number  Conditional Expression #5

$2rM/da \geq 0.7$  Conditional Expression #6.

According to the twenty-seventh aspect of the present invention, in the method of manufacturing an interchangeable lens of the twenty-second aspect, it is preferred that, when the maximum internal diameter part of the opening portion of the lens mount portion is termed rM, the flange back that is the distance upon the optical axis from the body mount portion to the light reception surface of the image sensor in a state that the interchangeable lens and the camera body are mutually engaged is termed da, and the aperture ratio of the optical system of the interchangeable lens is termed F-number, forming a lens mount so as to be satisfied the following equations:

$2rM/da \geq 1/F$-number  Conditional Expression #5

$2rM/da \geq 0.8$  Conditional Expression #6A.

According to the twenty-eighth aspect of the present invention, in the method of manufacturing an interchangeable lens of the twenty-second aspect, it is preferred that, when the maximum internal diameter part of the opening portion of the lens mount portion is termed rM, the flange back that is the distance upon the optical axis from the body mount portion to the light reception surface of the image sensor in a state that the interchangeable lens and the camera body are mutually engaged is termed da, and the aperture ratio of the optical of the interchangeable lens to the camera body is termed F-number, forming a lens mount so as to be satisfied the following equations:

$2rM/da \geq 1/F\text{-number}$　　　　　Conditional Expression #5

$2rM/da \geq 1.0$　　　　　Conditional Expression #6B.

According to the twenty-ninth aspect of the present invention, a method of manufacturing an interchangeable lens that is capable to be attached to the camera body that has a camera body mount portion and the image sensor whose whole pixels generate imaging signals can fit inside of a circle having a diameter in a range from 14.0 mm to 20.0 mm, comprises, when a maximum internal diameter part of an opening portion of the lens mount portion is termed rM and a distance from the lens mount portion to an image surface of the optical system is termed dB, forming a lens mount so as to be satisfied the following equations:

14.0 mm ≤ 2rM ≤ 40.0 mm　　　　　Conditional Expression #1

14.8 mm ≤ dB ≤ 18.8 mm　　　　　Conditional Expression #2-2, and assembling the interchangeable lens by combining the lens mount with an optical system.

According to the thirtieth aspect of the present invention, in the method of manufacturing an interchangeable lens of the twenty-ninth aspect, it is preferred that, when a distance upon the optical axis from the lens mount portion to the lens surface closest to the image is termed L (in case the lens mount portion is taken as a reference, the direction towards the image being considered positive and the direction towards the object to be photographed being considered negative), forming a lens mount so as to be satisfied the following equation:

L ≤ 11.0 mm　　　　　Conditional Expression #4.

According to the thirty-first aspect of the present invention, in the method of manufacturing an interchangeable lens of the twenty-ninth aspect, it is preferred that, when the maximum internal diameter part of the opening portion of the lens mount portion is termed rM, forming a lens mount so as to be satisfied the following equation:

18.0 mm ≤ 2rM ≤ 34.0 mm　　　　　Conditional Expression #1A.

According to the thirty-second aspect of the present invention, in the method of manufacturing an interchangeable lens of the twenty-ninth aspect, it is preferred that, when the maximum internal diameter part of the opening portion of the lens mount portion is termed rM, the distance from the lens mount portion to the image surface of the optical system is termed dB, and the aperture ratio of the optical system of the interchangeable lens is termed F-number, forming a lens mount so as to be satisfied the following equation:

$2rM/dB \geq 1/F\text{-number}$　　　　　Conditional Expression #5-2.

According to the thirty-third aspect of the present invention, in the method of manufacturing an interchangeable lens of the twenty-ninth aspect, it is preferred that, when the maximum internal diameter part of the opening portion of the lens mount portion is termed rM, the distance from the lens mount portion to the image surface of the optical system is termed dB, and the aperture ratio of the optical system of the interchangeable lens is termed F-number, forming a lens mount so as to be satisfied the following equations:

$2rM/dB \geq 1/F\text{-number}$　　　　　Conditional Expression #5-2

$2rM/dB \geq 0.7$　　　　　Conditional Expression #6-2.

According to the thirty-fourth aspect of the present invention, in the method of manufacturing an interchangeable lens of the twenty-ninth aspect, it is preferred that, when the maximum internal diameter part of the opening portion of the lens mount portion is termed rM, the distance from the lens mount portion to the image surface of the optical system is termed dB, and the aperture ratio of the optical system of the interchangeable lens is termed F-number, forming a lens mount so as to be satisfied the following equations:

$2rM/dB \geq 1/F\text{-number}$　　　　　Conditional Expression #5-2

$2rM/dB \geq 0.8$　　　　　Conditional Expression #6-2A.

According to the thirty-fifth aspect of the present invention, in the method of manufacturing an interchangeable lens of the twenty-ninth aspect, it is preferred that, when the maximum internal diameter part of the opening portion of the lens mount portion is termed rM, the distance from the lens mount portion to the image surface of the optical system is termed dB, and the aperture ratio of the optical of the interchangeable lens to the camera body is termed F-number, forming a lens mount so as to be satisfied the following equations:

$2rM/dB \geq 1/F\text{-number}$　　　　　Conditional Expression #5-2

$2rM/dB \geq 1.0$　　　　　Conditional Expression #6-2B.

BRIEF DESCRIPTION OF THE DRAWINGS

FIG. 7 shows a sectional view showing the structure of an interchangeable lens that incorporates a lens mount portion according to a fifth embodiment.

DESCRIPTION OF PREFERRED EMBODIMENTS

Figure 1:
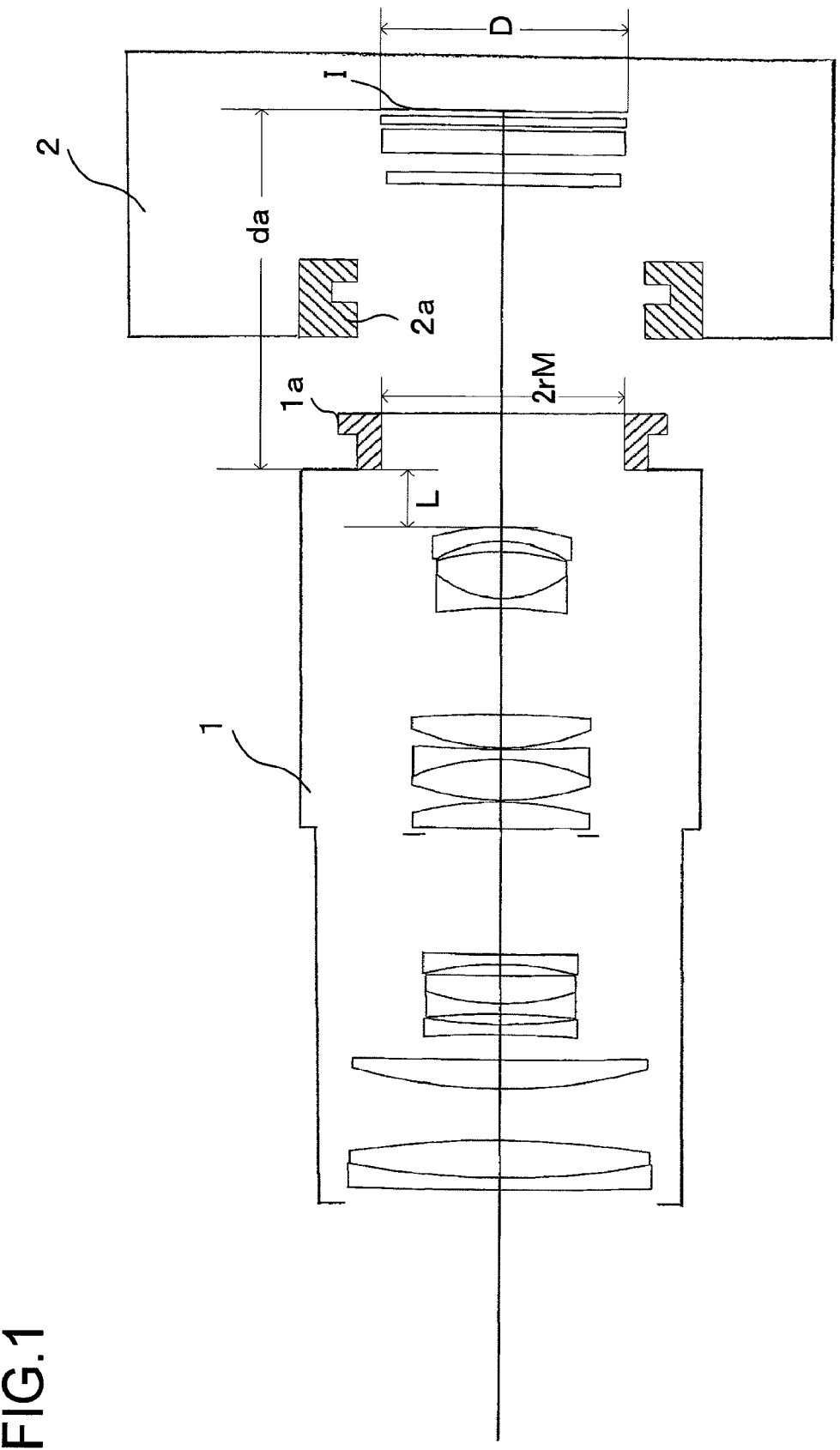
FIG. 1 shows a schematic constructional figure showing an interchangeable lens and a camera body incorporating the present invention in the mutually disengaged state.
Figure 2:
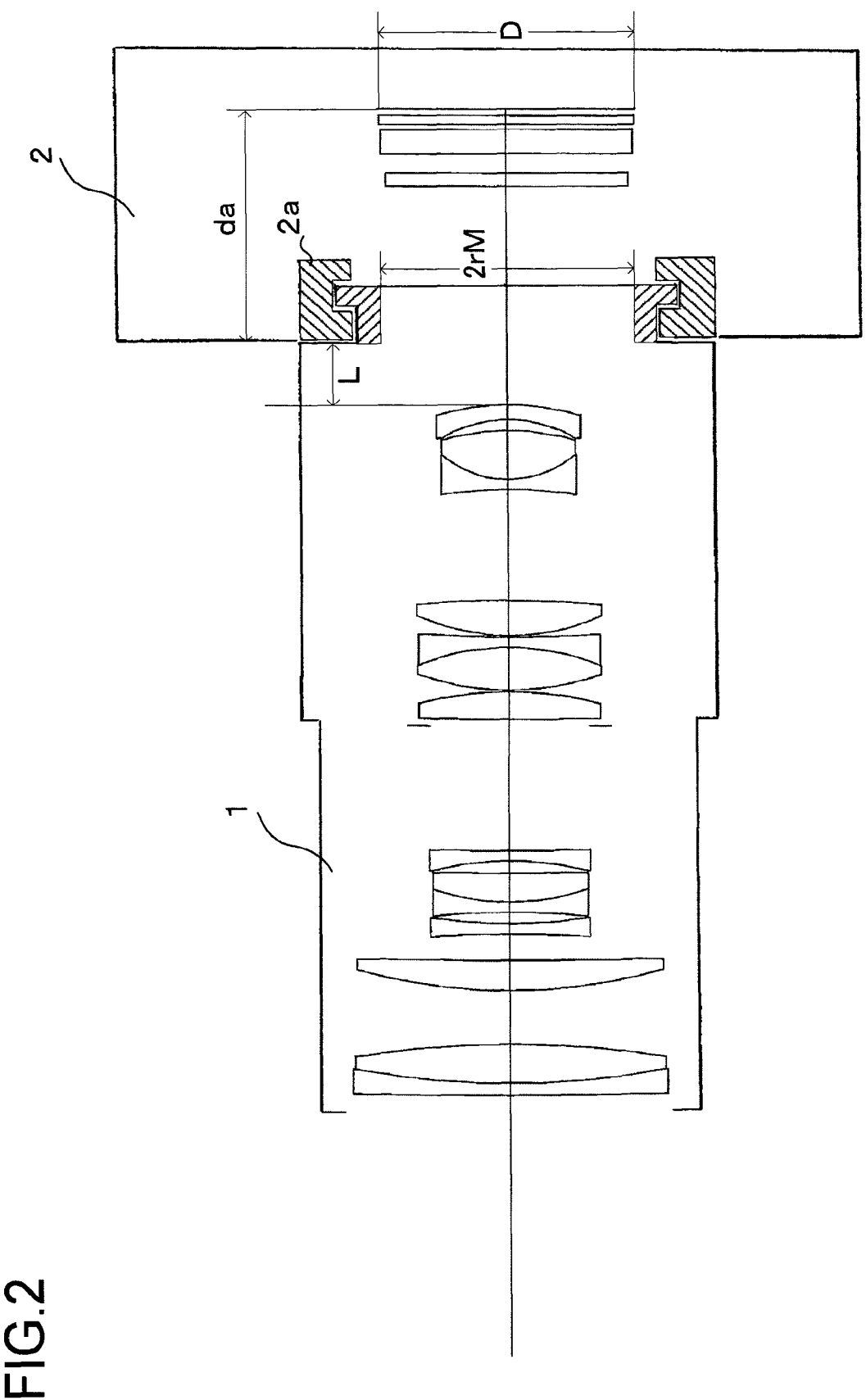
FIG. 2 shows a schematic constructional figure showing this interchangeable lens and camera body incorporating the present invention in the mutually engaged state.

FIG. 1 is a schematic constructional figure showing an interchangeable lens 1 and a camera body 2 incorporating a camera system according to the present invention in the mutually disengaged state, and FIG. 2 shows this interchangeable lens 1 and camera body 2 in the mutually engaged state. Referring to these figures, the camera system according to the present invention has a predetermined image circle, and includes the interchangeable lens 1 that has a lens mount portion for attachment to the camera body 2 and that is capable of forming an image within that image circle, and the camera body 2 that has an imaging element (image sensor) disposed within that image circle and a camera body mount portion 2a for attaching the interchangeable lens 1 so that it is disposed at a position separated by a predetermined distance from the light reception surface I of the imaging element (image sensor), wherein, when a radius of circular portion at a maximum internal diameter part of the opening portion of the lens mount portion is termed rM, the "flange back" (i.e. the distance upon the optical axis from the camera body mount portion to the light reception surface of the imaging element (image sensor) in a state that the interchangeable lens 1 and the camera body 2 are mutually engaged) is termed da, and the diameter of the image circle is termed D, then, by satisfying the following conditional expressions, it is possible to obtain a camera system with which it is possible to obtain an excellent imaging performance with a compact and thin structure:

$$14.0 \text{ mm} \leq 2rM \leq 40.0 \text{ mm} \quad \text{Conditional Expression \#1}$$

$$16.0 \text{ mm} \leq da \leq 20.0 \text{ mm} \quad \text{Conditional Expression \#2}$$

$$14.0 \text{ mm} \leq D \leq 20.0 \text{ mm} \quad \text{Conditional Expression \#3}.$$

Furthermore, when the distance upon the optical axis from the lens mount portion to the lens surface closest to the image is termed L (in case the lens mount portion being taken as a reference, the direction towards the image is considered positive and the direction towards the object that is to be photographed is considered negative), it is possible to obtain a camera with a suitable size:

$$L \leq 11.0 \text{ mm} \quad \text{Conditional Expression \#4}.$$

Furthermore, by the camera system according to the present invention satisfying the following conditional expressions, it is possible to obtain a camera system with which it is possible to implement a lens having a high aperture ratio with a sufficient amount of peripheral light.

$$2rM/da \geq 1/F\text{-number} \quad \text{Conditional Expression \#5}$$

$$2rM/da \geq 0.7 \quad \text{Conditional Expression \#6}.$$

Furthermore, the interchangeable lens according to the present invention has a lens mount portion for attachment to the camera body, and optical system that is capable of forming an image on a light reception surface of the imaging element (image sensor), and is capable to be attached to the camera body that has a camera body mount portion and an imaging element (image sensor) whose whole pixels generating imaging signals can fit inside of a circle whose diameter is in a range from 14.0 mm to 20.0 mm, and when a radius of circular portion at a maximum internal diameter part of the opening portion of the lens mount portion is termed rM, the flange back that is the distance upon the optical axis from the camera body mount portion to the light reception surface of the imaging element (image sensor) in a state that the interchangeable lens and the camera body are mutually engaged is termed da, it is possible to obtain a camera system with which it is possible to obtain an excellent imaging performance with a compact and thin structure:

$$14.0 \text{ mm} \leq 2rM \leq 40.0 \text{ mm} \quad \text{Conditional Expression \#1}$$

$$16.0 \text{ mm} \leq da \leq 20.0 \text{ mm} \quad \text{Conditional Expression \#2}.$$

Furthermore, the interchangeable lens according to the present invention has a lens mount portion for attachment to the camera body and optical system that is capable of forming an image on a light reception surface of the imaging element (image sensor), and is capable to be attached to the camera body that has a camera body mount portion and an imaging element (image sensor) whose whole pixels generating imaging signals can fit inside of a circle whose diameter is in a range from 14.0 mm to 20.0 mm, and when a radius of circular portion at a maximum internal diameter part of the opening portion of the lens mount portion is termed rM, a distance from the lens mount portion to an image surface of the optical system is termed dB, it is possible to obtain a camera system with which it is possible to obtain an excellent imaging performance with a compact and thin structure:

$$14.0 \text{ mm} \leq 2rM \leq 40.0 \text{ mm} \quad \text{Conditional Expression \#1}$$

$$14.8 \text{ mm} \leq dB \leq 18.8 \text{ mm} \quad \text{Conditional Expression \#2-2}.$$

Furthermore, by the interchangeable lens according to the present invention satisfying the following conditional expressions, it is possible to obtain a interchangeable lens having a high aperture ratio with a sufficient amount of peripheral light.

$$2rM/dB \geq 1/F\text{-number} \quad \text{Conditional Expression \#5-2}$$

$$2rM/dB \leq 0.7 \quad \text{Conditional Expression \#6-2}.$$

Conditional Expression #1 is a conditional expression for prescribing an optimum range for a radius of circular portion at a maximum internal diameter part of the opening portion of the lens mount portion rM of this camera system.

If the upper limit value in Conditional Expression #1 is exceeded, then the internal diameter of the lens mount portion is undesirably increased in size, and as a result this leads to undesirable increase in size of the camera body.

If the lower limit value in Conditional Expression #1 is not attained, then the lens mount portion internal diameter becomes small with respect to the image circle, and this is undesirable, and it becomes difficult to fit a lens that has a high aperture ratio. Moreover, this is not desirable because it becomes impossible to obtain a sufficient amount of peripheral light.

Furthermore, it is desirable for the radius of circular portion at a maximum internal diameter part of the opening portion of the lens mount portion rM to satisfy the condition $18.0 \text{ mm} \leq 2rM \leq 34.0 \text{ mm}$.

Conditional Expression #2 is a conditional expression for prescribing an optimum range for the flange back da, in order to attain an overall balance between compactness and performance of this camera system.

If the upper limit value in Conditional Expression #2 is exceeded, then it is necessary to design a lens having a long back focus, and as a result the total length of the lens is increased, that is undesirable. Moreover, the body becomes thicker, and this is also undesirable.

If the lower limit value in Conditional Expression #2 is not attained, then it is necessary to shorten the back focus, and as a result the exit pupil becomes short, and this is not desirable. Moreover, undesirable constraints arise with regard to ensuring the strength of the mounting members and arranging the members and so on.

It should be understood that, in order to ensure the benefits of the present invention, it is desirable to make the upper limit value in Conditional Expression #2 be 19.5. Moreover, in order further to ensure the benefits of the present invention, it is desirable to make the upper limit value in Conditional Expression #2 be 19.0. Yet further, in order even further to ensure the benefits of the present invention, it is desirable to make the upper limit value in Conditional Expression #2 be 18.5. Furthermore, in order to ensure the benefits of the present invention, it is desirable to make the lower limit value in Conditional Expression #2 be 16.5. Moreover, in order further to ensure the benefits of the present invention, it is desirable to make the lower limit value in Conditional Expression #2 be 17.0. Yet further, in order even further to ensure the benefits of the present invention, it is desirable to make the lower limit value in Conditional Expression #2 be 17.5.

Conditional Expression #2-2 is a conditional expression for prescribing an optimum range for the dB that is the distance from the lens mount portion to the image surface of the optical system, in order to attain an overall balance between compactness and performance of this interchangeable lens.

If the upper limit value in Conditional Expression #2-2 is exceeded, then it is necessary to design a lens having a long back focus, and as a result the total length of the lens is increased, that is undesirable.

If the lower limit value in Conditional Expression #2-2 is not attained, then it is necessary to shorten the back focus, and as a result the exit pupil becomes short, and this is not desirable. Moreover, undesirable constraints arise with regard to ensuring the strength of the mounting members and arranging the members and so on.

It should be understood that, in order to ensure the benefits of the present invention, it is desirable to make the upper limit value in Conditional Expression #2-2 be 18.3. Moreover, in order further to ensure the benefits of the present invention, it is desirable to make the upper limit value in Conditional Expression #2-2 be 17.8. Yet further, in order even further to ensure the benefits of the present invention, it is desirable to make the upper limit value in Conditional Expression #2-2 be 17.3. Furthermore, in order to ensure the benefits of the present invention, it is desirable to make the lower limit value in Conditional Expression #2-2 be 15.3. Moreover, in order further to ensure the benefits of the present invention, it is desirable to make the lower limit value in Conditional Expression #2-2 be 15.8. Yet further, in order even further to ensure the benefits of the present invention, it is desirable to make the lower limit value in Conditional Expression #2-2 be 16.3.

It should be understood that, the distance dB from the lens mount portion to the image surface of the optical system, the air conversion length Bf, and the distance L upon the optical axis from the lens mount portion to the lens surface closest to the image (in case the lens mount portion 1$a$ being taken as a reference, the direction towards the image is considered positive and the direction towards the object that is to be photographed is considered negative) have a relationship of dB=Bf+L.

Conditional Expression #3 is a conditional expression for prescribing an optimum range for the image circle D, in order to attain an overall balance between compactness and performance of this camera system.

If the upper limit value in Conditional Expression #3 is exceeded, then designing an optical system that ensures a sufficiently long exit pupil becomes difficult, and this is undesirable. Moreover, as a result, the external diameter of the lens barrel is undesirably increased.

If the lower limit value in Conditional Expression #3 is not attained, then, while there is an advantage in terms of making the system more compact, the refractive power of each of the lens components included in the optical system becomes stronger, and this is not desirable. When the refractive power becomes stronger, the accuracy demanded for each of the lens components and for their assembly becomes more severe, and as a result it becomes impossible to provide satisfactory imaging performance, and this is very undesirable.

It should be understood that, in order to ensure the benefits of the present invention, it is desirable to make the upper limit value in Conditional Expression #3 be 19.5. Moreover, in order further to ensure the benefits of the present invention, it is desirable to make the upper limit value in Conditional Expression #3 be 19.0. Yet further, in order even further to ensure the benefits of the present invention, it is desirable to make the upper limit value in Conditional Expression #3 be 18.5. Still further, in order yet further to ensure the benefits of the present invention, it is desirable to make the upper limit value in Conditional Expression #3 be 18.0. Moreover, in order even further to ensure the benefits of the present invention, it is desirable to make the upper limit value in Conditional Expression #3 be 17.5.

Furthermore, in order to ensure the benefits of the present invention, it is desirable to make the lower limit value in Conditional Expression #3 be 14.5. Moreover, in order further to ensure the benefits of the present invention, it is desirable to make the lower limit value in Conditional Expression #3 be 15.0. Yet further, in order even further to ensure the benefits of the present invention, it is desirable to make the lower limit value in Conditional Expression #3 be 15.5.

Conditional Expression #4 is a conditional expression for prescribing an appropriate range for the mechanical projection amount L on the image side of the optical system included in the interchangeable lens of this camera system.

If the upper limit value in Conditional Expression #4 is exceeded, then the lens or a member that supports the lens or the like may undesirably interfere with the camera body, and this is difficult to correct.

It should be understood that, in order to ensure the benefits of the present invention, it is desirable to make the upper limit value in Conditional Expression #4 be 7.00. Moreover, in order further to ensure the benefits of the present invention, it is desirable to make the upper limit value in Conditional Expression #4 be 4.50.

Furthermore, it is desirable for the distance L upon the optical axis from the lens mount portion to the lens surface closest to the image to satisfy the condition $-140.0$ mm$\leq$L$\leq$11.0 mm. By satisfying the lower limit value condition, it is not necessary to provide an optical system which has unnecessarily long exit pupil, and as a result the total length of the optical system does not become long and becomes possible to implement a lend in a compact.

Conditional Expressions #5 and #6 are conditional expressions for ensuring that the flange back da and the radius of circular portion at a maximum internal diameter part of the opening portion of the lens mount portion rM are appropriate.

By satisfying these conditions, it becomes possible to implement a lens of a high aperture ratio, and it also becomes possible to implement a lens that can obtain a sufficient amount of peripheral light.

It should be understood that, in order to ensure the benefits of the present invention, it is desirable to make the lower limit value in Conditional Expression #6 be 0.8. Moreover, in order further to ensure the benefits of the present invention, it is desirable to make the lower limit value in Conditional Expression #6 be 1.0.

Conditional Expressions #5-2 and #6-2 are conditional expressions for ensuring that the distance from the lens mount portion to the image surface of the optical system dB and the radius of circular portion at a maximum internal diameter part of the opening portion of the lens mount portion rM are appropriate.

By satisfying these conditions, it becomes possible to implement a lens of a high aperture ratio, and it also becomes possible to implement a lens that can obtain a sufficient amount of peripheral light.

It should be understood that, in order to ensure the benefits of the present invention, it is desirable to make the lower limit value in Conditional Expression #6-2 be 0.8. Moreover, in order further to ensure the benefits of the present invention, it is desirable to make the lower limit value in Conditional Expression #6-2 be 1.0.

Furthermore, with the present invention, in order to prevent failure of photography due to image shaking originating in hand shaking or the like, by combining a shake detection system that detects shaking of the lens system and a drive means with the lens system, and by driving all or a part of a single lens group among the lens groups that make up the optical system off from the center line so that it functions as a shift lens group, it is possible to correct for image shaking by shifting the image by driving the shift lens group with the drive means, so as to correct for image shaking (fluctuation of the image surface position) originating in shaking of the lens system detected by this shake detection system. As described above, the image capturing lens of the present invention can function as a so called anti-vibration optical system.

Moreover, with the present invention, in order to prevent failure of photography due to image shaking originating in hand shaking or the like, by combining a shake detection system that detects shaking of the camera and the lens and a drive means with the imaging element (image sensor), and by driving all or a part of a member included in the imaging element (image sensor) and shifting it off from the center line, it is possible to correct for image shaking by shifting the image by driving the member included in the imaging element (image sensor) with the drive means, so as to correct for image shaking (fluctuation of the image surface position) originating in shaking of the camera and the lens detected by this shake detection system. As described above, the camera system of the present invention can function as a so called anti-vibration system.

Furthermore, in the various embodiments of the present invention, it would also be possible to add other lens groups between the lens groups, or to add other lens groups to the lens system proximate to the image side or to the side of the object to be photographed.

It should be understood that the following details may be employed appropriately, within the range in which the optical performance is not deteriorated.

First, it would also be acceptable to employ aspherical surfaces for the lens surfaces. In this case any type of aspherical surface may be used, such as for example an aspherical surface formed by a grinding process, a molded glass aspherical surface that is formed into an aspherical surface shape by glass molding, or a compound type aspherical surface that is made by forming resin into an aspherical surface upon a glass surface.

Moreover, it would also be possible to make the lens surface as a diffraction surface, or to make the lens as a gradient index lens (i.e. a GRIN lens) or as a plastic lens.

Yet further, by implementing an antireflection coating having high transmittance over a wide wavelength region upon each of the lens surfaces, it is possible to attain a high optical performance with high contrast while alleviating flaring and ghosting.

The image capture lens systems according to the embodiments of the present invention include, in order from the object to be photographed, lens components that constitute an interchangeable lens, a filter group FL disposed within the camera body including a low pass filter and/or an infra-red cutout filter and so on, and a light reception surface of an imaging element (image sensor) I.

Furthermore, during change of the focal state from a focused state at infinity to a focused state at close range (in other words, focusing), focusing is performed by shifting some lens component along the direction of the optical axis.

In the embodiments, if the height in the direction perpendicular to the optical axis is termed y, the distance along the optical axis (i.e. the sag amount) from the contact plane of the vertex of aspherical surface at the height y to aspherical surface is termed S(y), the radius of curvature of a reference spherical surface (i.e. the paraxial radius of curvature) is termed r, the conical constant is termed κ, and the n-th order aspherical surface coefficient is termed An, then the aspherical surfaces are given by the following Equation:

$$S(y)=(y^2/r)/\{1+(1-\kappa \times y^2/r^2)^{1/2}\}+A4 \times y^4+A6 \times y^6+A8 \times y^8+A10 \times y^{10}$$ Equation (a).

It should be understood that, in these embodiments, the secondary aspherical surface coefficient A2 is 0. In the tables for the various embodiments, an asterisk is prefixed to the surface numbers of aspherical surfaces.

—The First Embodiment—

Figure 3:
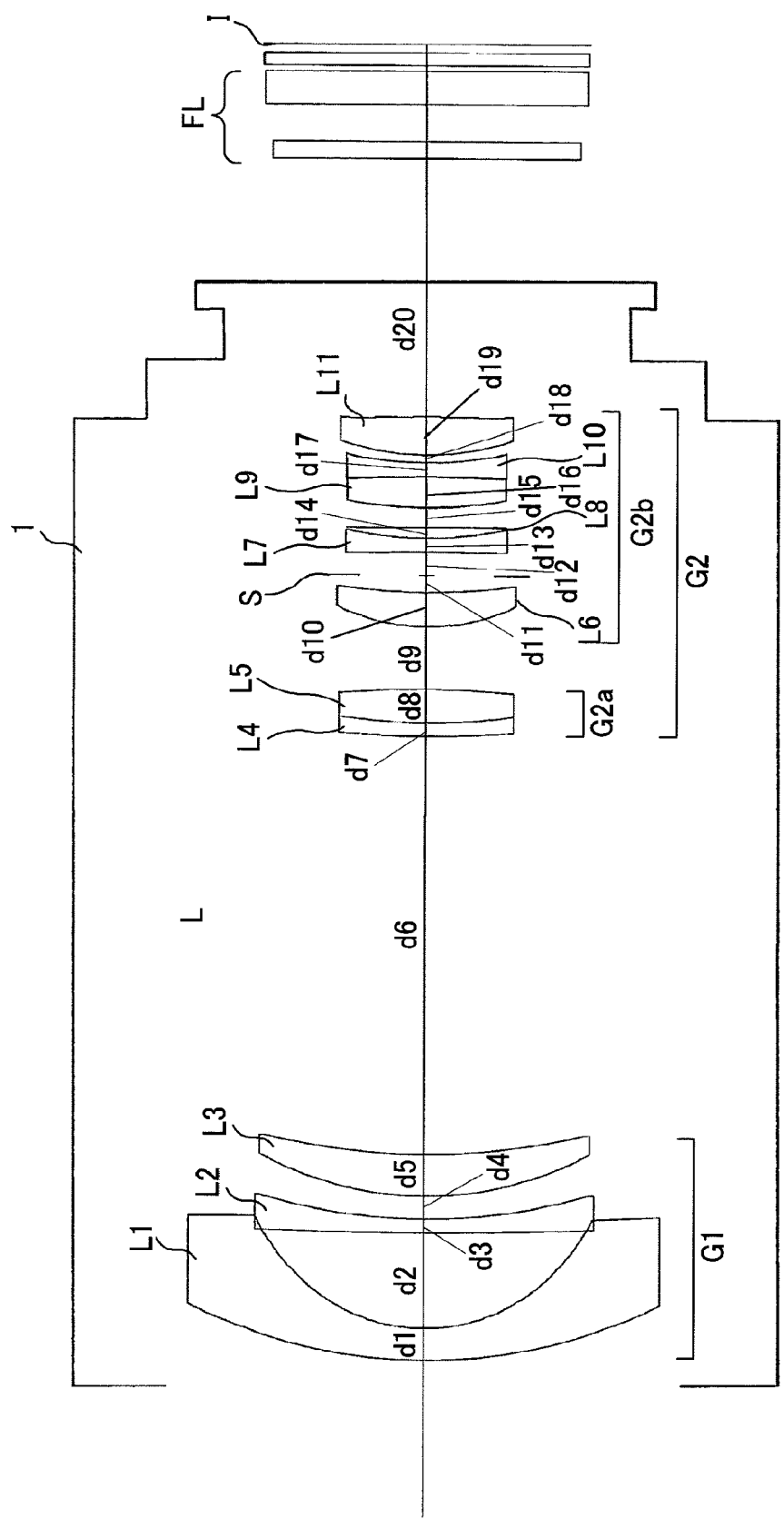
FIG. 3 shows a sectional view showing the structure of an interchangeable lens that incorporates a lens mount portion according to a first embodiment.

FIG. 3 is a figure showing the structure of an image capture lens system according to a first embodiment of the present invention. The optical system of this interchangeable lens 1 of FIG. 3 is a zoom lens of a two-group structure incorporating a first lens group G1 and a second lens group G2, and furthermore the second lens group G2 incorporates a 2a-th lens group G2a and a 2b-th lens group G2b.

The first lens group G1 includes a first lens component L1 that is a negative meniscus lens whose convex surface faces towards the object to be photographed, a second lens component L2 that is a negative meniscus lens whose convex surface faces towards the object to be photographed, and a third lens component L3 that is a positive meniscus lens whose convex surface faces towards the object to be photographed.

The 2a-th lens group G2a is made as a cemented lens in which a fourth lens L4 that is a negative meniscus lens whose convex surface faces the object to be photographed and a fifth lens L5 that is a biconvex lens are glued together.

And the 2b-th lens group G2b includes a sixth lens component L6 that is a positive meniscus lens whose convex surface faces towards the object to be photographed, a cemented lens in which a seventh lens component L7 that is a biconcave lens and an eighth lens component L8 that is a biconvex lens are glued together, a cemented lens in which a ninth lens component L9 that is a biconvex lens and a tenth lens component L10 that is a biconcave lens are cemented together, and an eleventh lens component L11 that is a biconvex lens.

Furthermore, a filter group FL includes a low pass filter and an infra-red cutoff filter and so on.

A light reception surface of an imaging element (image sensor) not shown in the figures constitutes an image surface I, with this imaging element (image sensor) being a solid imaging element (image sensor) such as a CCD or a CMOS or the like (and the same holds for the subsequent embodiments).

Moreover, an aperture stop S is disposed within the second lens group G2, and is fixed with respect to the image surface during focusing from the infinity state to the close-up state.

The values specified in this first embodiment of the present invention are displayed in the following Table 1. In Table 1, f is the focal length, F-number is the F number, and 2ω is the field angle. Moreover, the surface number is the number in order of the lens surface from the object to be photographed along the direction of travelling of the light rays, while the refractive index and the Abbe number are the values for d line (λ=587.6 nm). Here, while the units used in the specification values below for focal length f, radius of curvature r, and surface gap d are in general "mm", this is not to be considered as being limitative, since the optical system will provide the same optical performance even if its overall size is proportionally increased or decreased. It should be understood that a radius of curvature of 0.0000 denotes a plane, and that the refractive index of air is omitted since it is 1.00000.

TABLE 1

|  | wide angle end | intermediate focal length | telephoto end |
|---|---|---|---|
| f = | 10.30~ | 18.75~ | 29.10 |
| F-number = | 3.64~ | 4.58~ | 5.85 |
| 2ω = | 78.99~ | 46.54~ | 30.69 |
| image height = | 7.96~ | 7.96~ | 7.96 |
| lens total length = | 75.01~ | 68.45~ | 73.01 |
| air conversion length Bf = | 20.01~ | 29.36~ | 40.81 |

| surface number | radius of curvature | surface gap | refractive index | Abbe number |
|---|---|---|---|---|
| 1 | 25.1496 | 1.80 | 1.77377 | 47.17 |
| *2 | 8.2125 | 5.45 | | |
| 3 | 196.3246 | 0.80 | 1.75500 | 52.32 |
| 4 | 27.6871 | 1.30 | | |
| 5 | 16.4584 | 2.40 | 1.84666 | 23.78 |
| 6 | 32.8415 | (d6) | | |
| 7 | 48.1525 | 0.80 | 1.80810 | 22.76 |
| 8 | 29.9255 | 1.90 | 1.65160 | 58.55 |
| 9 | −48.2103 | (d9) | | |
| 10 | 9.6852 | 1.95 | 1.60300 | 65.44 |
| 11 | 25.9987 | 1.00 | | |
| 12 | 0.0000 | 1.30 | | (aperture stop S) |
| 13 | −2813.1247 | 0.80 | 1.82080 | 42.71 |
| *14 | 16.7458 | 0.60 | | |
| 15 | 0.0000 | 1.15 | | |
| 16 | 20.3251 | 1.75 | 1.49700 | 81.54 |
| 17 | −90.6835 | 0.80 | 1.83400 | 37.16 |
| 18 | 17.5678 | 0.45 | | |
| 19 | 12.4017 | 2.15 | 1.66910 | 55.42 |
| *20 | −71.9576 | (d20) | | |
| 21 | 0.0000 | 1.00 | 1.51680 | 64.10 |
| 22 | 0.0000 | 2.13 | | |
| 23 | 0.0000 | 1.87 | 1.51680 | 64.10 |
| 24 | 0.0000 | 0.30 | | |
| 25 | 0.0000 | 0.70 | 1.51680 | 64.10 |
| 26 | 0.0000 | 0.50 | | |

| focal length of each lens group | | |
|---|---|---|
| group | first surface | focal length |
| 1 | 1 | −18.1260 |
| 2 | 7 | 20.0528 |

In this first embodiment of the present invention, the lens surfaces for the second surface, the fourteenth surface, and the twentieth surface are formed as aspherical surfaces. The data for these aspherical surfaces, in other words the values of their vertex radiuses of curvature R, their conic constants κ, and their aspherical surface constants A4 through A10 are shown in the following Table 2.

TABLE 2

| R | κ | A4 | A6 | A8 | A10 |
|---|---|---|---|---|---|
| The second surface | | | | | |
| 8.2125 | +0.6130 | $+1.9235 \times 10^{-5}$ | $+1.4500 \times 10^{-7}$ | $+1.3915 \times 10^{-9}$ | $+1.5970 \times 10^{-12}$ |
| The fourteenth surface | | | | | |
| 16.7458 | +0.1364 | $-3.4025 \times 10^{-5}$ | $+1.6024 \times 10^{-6}$ | $-2.106210 \times 10^{-7}$ | $+7.1555 \times 10^{-9}$ |
| The twentieth surface | | | | | |
| −71.9576 | −8.5090 | $+2.4560 \times 10^{-4}$ | $+2.7700 \times 10^{-6}$ | $-3.1700 \times 10^{-8}$ | $+4.6515 \times 10^{-10}$ |

In this first embodiment of the present invention, the air gap d6 on the optical axis between the first lens group G1 and the second lens group G2, the air gap d9 on the optical axis between the 2a-th lens group G2a and the 2b-th lens group G2b, and the air gap d20 on the optical axis between the second lens group G2 and the filter group FL are changed during zooming. The variable gaps during focusing at infinity when the focal length is set to the wide angle end state, the intermediate focal length state, and the telephoto end state are shown in the following Table 3.

TABLE 3

|  | wide angle end | intermediate focal length | telephoto end |
|---|---|---|---|
| f | 10.3000 | 18.7500 | 29.1000 |
| d6 | 23.8068 | 7.9033 | 1.0085 |
| d9 | 3.5766 | 3.5766 | 3.5766 |
| d20 | 14.7252 | 24.0734 | 35.5235 |

The values corresponding to each of the conditional expressions in this first embodiment of the present invention are shown in the next Table (4).

TABLE 4 da = 18.0000
TLw = 75.0086
Σdw = 53.7834
Ymax = 7.9600
F-number w = 3.6380
F-number m = 4.5812
F-number t = 5.8528
Conditional Expression #1 2rM = 27.0
Conditional Expression #2 da = 18.0000
Conditional Expression #2-2 dB = 16.7836
Conditional Expression #3 D = 15.9200
Conditional Expression #4 L = −3.2252 (wide angle end)
Conditional Expression #5 (2rM/da = 1.50) 1.50 ≥ 1/3.638, 1/4.5812, 1/5.8528
Conditional Expression #5-2 (2rM/dB = 1.6087) 1.6087 ≥ 1/3.638, 1/4.5812, 1/5.8528

—The Second Embodiment—

Figure 4:
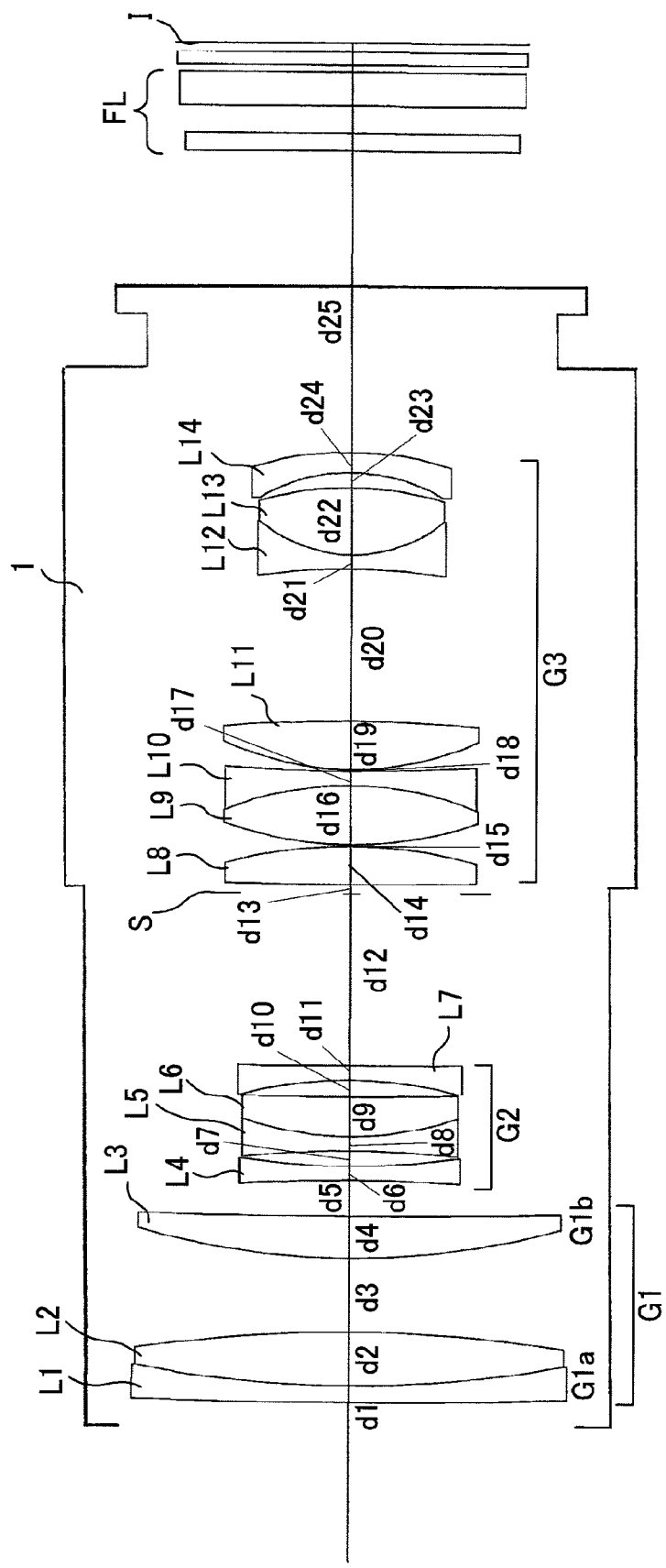
FIG. 4 shows a sectional view showing the structure of an interchangeable lens that incorporates a lens mount portion according to a second embodiment.

FIG. 4 is a figure showing the structure of an image capture lens system according to a second embodiment of the present invention. The optical system of this interchangeable lens 1 of FIG. 4 is a zoom lens of a three-group structure incorporating a first lens group G1, a second lens group G2, and a third lens group G3, and furthermore the first lens group G1 incorporates a 1a-th lens group G1a and a 1b-th lens group G1b. The 1a-th lens group G1a is made as a cemented lens in which a first lens L1 that is a negative meniscus lens whose convex surface faces the object to be photographed and a second lens L2 that is a biconvex lens are glued together.

And the 1b-th lens group G1b includes a third lens component L3 that is a positive meniscus lens whose convex surface faces towards the object to be photographed.

And the second lens group G2 includes a fourth lens component L4 that is a biconcave lens, a cemented lens in which a fifth lens component L5 that is a biconcave lens and a sixth lens component L6 that is a positive meniscus lens whose convex surface faces towards the object to be photographed are glued together, and a seventh lens component L7 that is a biconcave lens.

Moreover, the third lens group G3 includes an eighth lens component L8 that is a biconvex lens, a cemented lens in which a ninth lens component L9 that is a biconvex lens and a tenth lens component L10 that is a biconcave lens are glued together, an eleventh lens component L11 that is a biconvex lens, a cemented lens in which a twelfth lens component L12 that is a biconcave lens and a thirteenth lens component L13 that is a biconvex lens are glued together, and a fourteenth lens component L14 that is a negative meniscus lens whose concave surface faces towards the image.

Furthermore, a filter group FL includes a low pass filter and an infra-red cutoff filter and so on.

Moreover, an aperture stop S is disposed between the second lens group G2 and the third lens group G3, and is fixed with respect to the image surface of the second lens group G2 or the third lens group G3 during focusing from the infinity state to the close-up state.

The values specified in this second embodiment of the present invention are displayed in the following Table 5. In Table 5, f is the focal length, F-number is the F number, and 2ω is the field angle. Moreover, the surface number is the number in order of the lens surface from the object to be photographed along the direction of travelling of the light rays, while the refractive index and the Abbe number are the values for d line (λ=587.6 nm). Here, while the units used in the specification values below for focal length f, radius of curvature r, and surface gap d are in general "mm", this is not to be considered as being limitative, since the optical system will provide the same optical performance even if its overall size is proportionally increased or decreased. It should be understood that a radius of curvature of 0.0000 denotes a plane, and that the refractive index of air is omitted since it is 1.0000.

TABLE 5

|  | wide angle end | intermediate focal length | telephoto end |
|---|---|---|---|
| f = | 30.00~ | 65.50~ | 107.09 |
| F-number = | 4.14~ | 4.85~ | 5.75 |
| 2ω = | 31.89~ | 14.24~ | 8.79 |
| image height = | 8.50~ | 8.50~ | 8.50 |
| lens total length = | 76.00~ | 95.28~ | 105.00 |
| air conversion length Bf = | 21.57~ | 26.99~ | 34.74 |

| surface number | radius of curvature | surface gap | refractive index | Abbe number |
|---|---|---|---|---|
| 1 | 346.7451 | 0.95 | 1.83400 | 37.16 |
| 2 | 54.0425 | 3.00 | 1.49782 | 82.52 |
| 3 | −63.5775 | (d3) |  |  |
| 4 | 36.4849 | 2.35 | 1.49782 | 82.52 |
| 5 | 474.1283 | (d5) |  |  |
| 6 | −81.0984 | 0.80 | 1.69680 | 55.53 |
| 7 | 35.2884 | 0.85 |  |  |
| 8 | −45.4861 | 0.80 | 1.69680 | 55.53 |
| 9 | 15.4621 | 2.20 | 1.84666 | 23.78 |
| 10 | 242.8730 | 0.95 |  |  |
| 11 | −19.8007 | 0.80 | 1.72916 | 54.68 |
| 12 | 405.4435 | (d12) |  |  |
| 13 | 0.0000 | 0.50 |  | (aperture stop S) |
| 14 | 348.1094 | 2.15 | 1.60311 | 60.64 |
| 15 | −21.6711 | 0.10 |  |  |
| 16 | 18.4392 | 3.30 | 1.49782 | 82.52 |
| 17 | −15.2984 | 0.80 | 1.80384 | 33.89 |
| 18 | 95.0246 | 0.10 |  |  |
| 19 | 14.4846 | 2.70 | 1.60300 | 65.44 |
| 20 | −68.6868 | 8.55 |  |  |
| 21 | −28.4844 | 0.80 | 1.74399 | 44.79 |
| 22 | 6.8364 | 3.75 | 1.61293 | 37.00 |
| 23 | −14.9063 | 0.84 |  |  |
| 24 | −8.3732 | 1.15 | 1.78800 | 47.37 |
| 25 | −15.0720 | (d25) |  |  |
| 26 | 0.0000 | 1.00 | 1.51680 | 64.12 |
| 27 | 0.0000 | 1.50 |  |  |
| 28 | 0.0000 | 1.87 | 1.51680 | 64.12 |
| 29 | 0.0000 | 0.40 |  |  |
| 30 | 0.0000 | 0.70 | 1.51680 | 64.12 |
| 31 | 0.0000 | 0.50 |  |  |

| focal length of each lens group | | |
|---|---|---|
| group | first surface | focal length |
| 1 | 1 | 60.3701 |
| 2 | 6 | −12.2950 |
| 3 | 14 | 14.4853 |

In this second embodiment of the present invention, the air gap d3 on the optical axis between the 1a-th lens group G1a and the 1b-th lens group G1b, the air gap d5 on the optical axis between the first lens group G1 and the second lens group G2, the air gap d12 on the optical axis between the second lens group G2 and the third lens group G3, and the air gap d25 on the optical axis between the third lens group G3 and the filter group FL are changed during zooming. The variable gaps during focusing at infinity when the focal length is set to the wide angle end state, the intermediate focal length state, and the telephoto end state are shown in the following Table 6.

TABLE 6

|  | wide angle end | intermediate focal length | telephoto end |
|---|---|---|---|
| f | 30.0001 | 65.5002 | 107.0905 |
| d3 | 4.1293 | 4.1293 | 4.1293 |
| d5 | 2.0000 | 20.3065 | 25.6415 |
| d12 | 9.6402 | 5.2156 | 1.8304 |
| d25 | 16.8184 | 22.2346 | 29.9867 |

The values corresponding to each of the conditional expressions in this second embodiment of the present invention are shown in the next Table (7).

TABLE 7 da = 17.0000
TLw = 76.0001
Σdw = 53.2116
Ymax = 8.5000
F-number w = 4.1735
F-number m = 4.8232
F-number t = 5.7441
Conditional Expression #1 2rM = 33.0
Conditional Expression #2 da = 17.0
Conditional Expression #2-2 dB = 15.7836
Conditional Expression #3 D = 17.0
Conditional Expression #4 L = −5.7885 (wide angle end)
Conditional Expression #5 (2rM/da = 1.9412) 1.9412 ≥ 1/4.1735, 1/4.8232, 1/5.7441
Conditional Expression #5-2 (2rM/dB = 2.0908) 2.0908 ≥ 1/4.1735, 1/4.8232, 1/5.7441

—The Third Embodiment—

Figure 5:
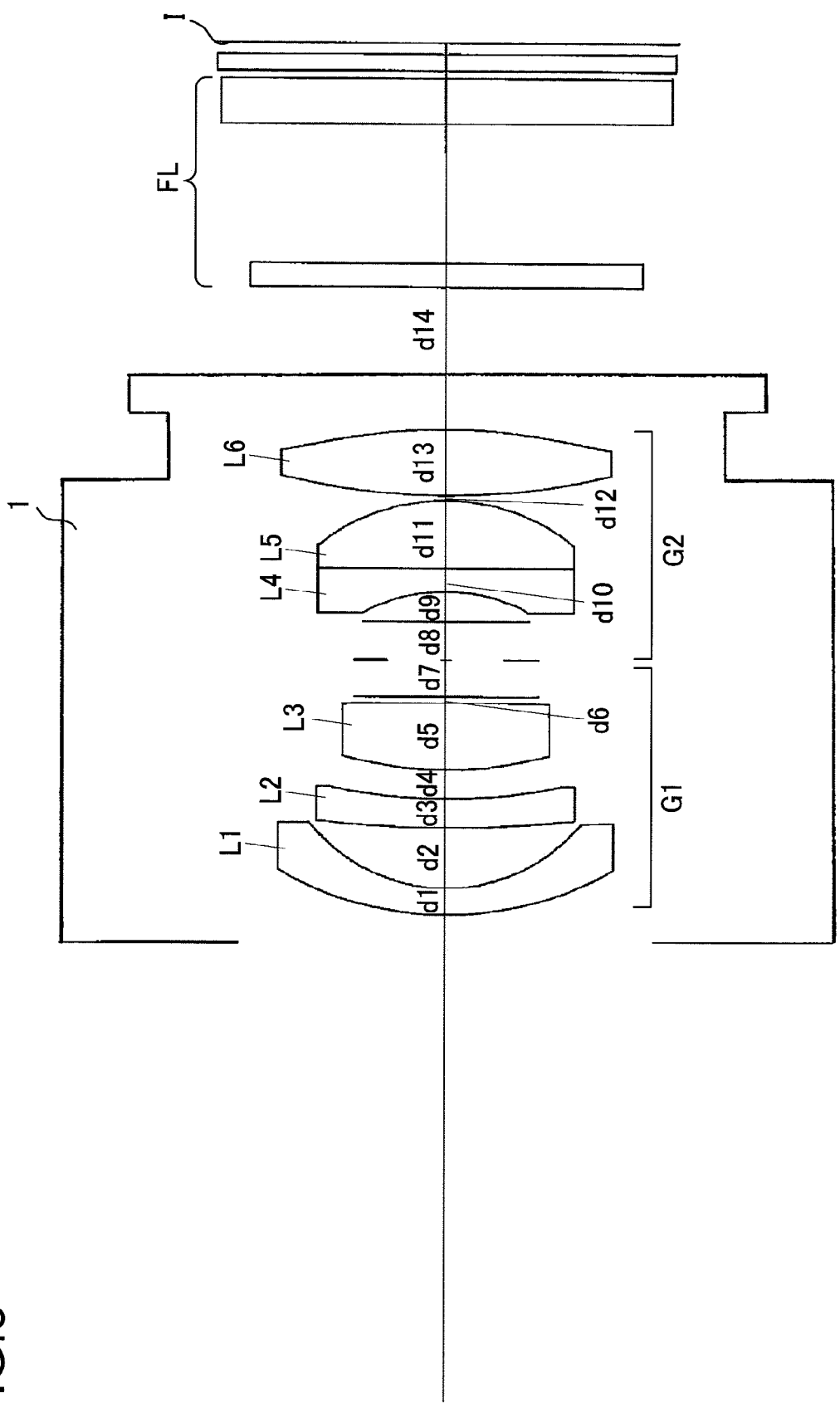
FIG. 5 shows a sectional view showing the structure of an interchangeable lens that incorporates a lens mount portion according to a third embodiment.

FIG. 5 is a figure showing the structure of an image capture lens system according to a third embodiment of the present invention. The optical system of this interchangeable lens 1 of FIG. 5 is a single focus lens incorporating a first lens group G1 and a second lens group G2.

The first lens group G1 includes a first lens component L1 that is a negative meniscus lens whose convex surface faces towards the object to be photographed, a second lens component L2 that is a negative meniscus lens whose convex surface faces towards the object to be photographed, and a third lens component L3 that is a biconvex lens.

And the second lens group G2 includes a cemented lens in which a fourth lens component L4 that is a biconcave lens and an fifth lens component L5 that is a biconvex lens are glued together, and a sixth lens component L6 that is a biconvex lens.

Furthermore, a filter group FL includes a low pass filter and an infra-red cutoff filter and so on.

Moreover, an aperture stop S is disposed between the first lens group G1 and the second lens group G2, and is fixed with respect to the image surface during focusing from the infinity state to the close-up state.

The values specified in this third embodiment of the present invention are displayed in the following Table 8. In Table 8, f is the focal length, F-number is the F number, and 2ω is the field angle. Moreover, the surface number is the number in order of the lens surface from the object to be photographed along the direction of travelling of the light rays, while the refractive index and the Abbe number are the values for d line (λ=587.6 nm). Here, while the units used in the specification values below for focal length f, radius of curvature r, and surface gap d are in general "mm", this is not to be considered as being limitative, since the optical system will provide the same optical performance even if its overall size is proportionally increased or decreased. It should be understood that a radius of curvature of 0.0000 denotes a plane, and that the refractive index of air is omitted since it is 1.00000.

TABLE 8 f = 10.60
F-number = 2.87
2ω = 76.93
image height = 8.19
total length = 35.98
air conversion length Bf = 14.71

| surface number | radius of curvature | surface gap | refractive index | Abbe number |
|---|---|---|---|---|
| 1 | 11.6151 | 1.10 | 1.69350 | 53.20 |
| *2 | 5.8232 | 2.50 | | |
| 3 | 39.6894 | 1.20 | 1.67790 | 55.34 |
| 4 | 19.5461 | 1.20 | | |
| 5 | 13.5252 | 2.75 | 1.90366 | 31.31 |
| 6 | −336.4314 | 0.25 | | |
| 7 | 0.0000 | 1.55 | | |
| 8 | 0.0000 | (d8) | | (aperture stop S) |
| 9 | 0.0000 | 1.25 | | |

TABLE 8-continued

| 10 | −6.0487 | 0.95 | 1.80518 | 25.42 |
|---|---|---|---|---|
| 11 | 1661.0055 | 2.80 | 1.75500 | 52.32 |
| 12 | −7.1834 | 0.20 | | |
| 13 | 23.0502 | 2.75 | 1.59201 | 67.02 |
| *14 | −17.3125 | (d14) | | |
| 15 | 0.0000 | 1.00 | 1.51633 | 64.14 |
| 16 | 0.0000 | 5.73 | | |
| 17 | 0.0000 | 1.87 | 1.51633 | 64.14 |
| 18 | 0.0000 | 0.30 | | |
| 19 | 0.0000 | 0.70 | 1.51633 | 64.14 |
| 20 | 0.0000 | 0.48 | | | focal length of each lens group

| group | first surface | focal length |
|---|---|---|
| 1 | 1 | 106.9661 |
| 2 | 10 | 13.0930 |

In this third embodiment of the present invention, the lens surfaces for the second surface and the fourteenth surface are formed as aspherical surfaces. The data for these aspherical surfaces, in other words the values of their vertex radiuses of curvature R, their conic constants κ, and their aspherical surface constants A4 through A10 are shown in the following Table 9.

TABLE 9

| R | κ | A4 | A6 | A8 | A10 |
|---|---|---|---|---|---|
| | | The second surface | | | |
| 5.8232 | +0.2484 | $+2.8541 \times 10^{-4}$ | $+5.1153 \times 10^{-6}$ | $+6.0420 \times 10^{-9}$ | $+2.4456 \times 10^{-9}$ |
| | | The fourteenth surface | | | |
| −17.3125 | −19.0000 | $-2.8224 \times 10^{-4}$ | $+9.8015 \times 10^{-6}$ | $-1.4878 \times 10^{-7}$ | $+1.1010 \times 10^{-9}$ |

In this third embodiment of the present invention, the air gap d8 on the optical axis between the aperture stop S and the second lens group G2 and the air gap d14 on the optical axis between the second lens group G2 and the filter group FL are changed during focusing. These variable gaps during the infinity focused state and the close-up focused state are shown in the following Table 10. It should be understood that the close-up distance is a photographic distance of 0.5 m.

TABLE 10

| | infinity focused state | close-up focused state |
|---|---|---|
| d2 | 1.5591 | 1.3171 |
| d14 | 5.8409 | 6.0829 |

The values corresponding to each of the conditional expressions in this third embodiment of the present invention are shown in the following Table (11).

TABLE 11 da = 18.5000
TLw = 35.9826
Σdw = 20.0591
Ymax = 8.1900
F-number = 2.8685
Conditional Expression #1 2rM = 18.0
Conditional Expression #2 da = 18.5
Conditional Expression #2-2 dB = 17.2836
Conditional Expression #3 D = 16.38

TABLE 11-continued

Conditional Expression #4 L = 2.5765
Conditional Expression #5 (2rM/da = 0.9730) 0.9730 ≥ 1/2.8685
Conditional Expression #5-2 (2rM/dB = 1.0414) 1.0414 ≥ 1/2.8685

—The Fourth Embodiment—

Figure 6:
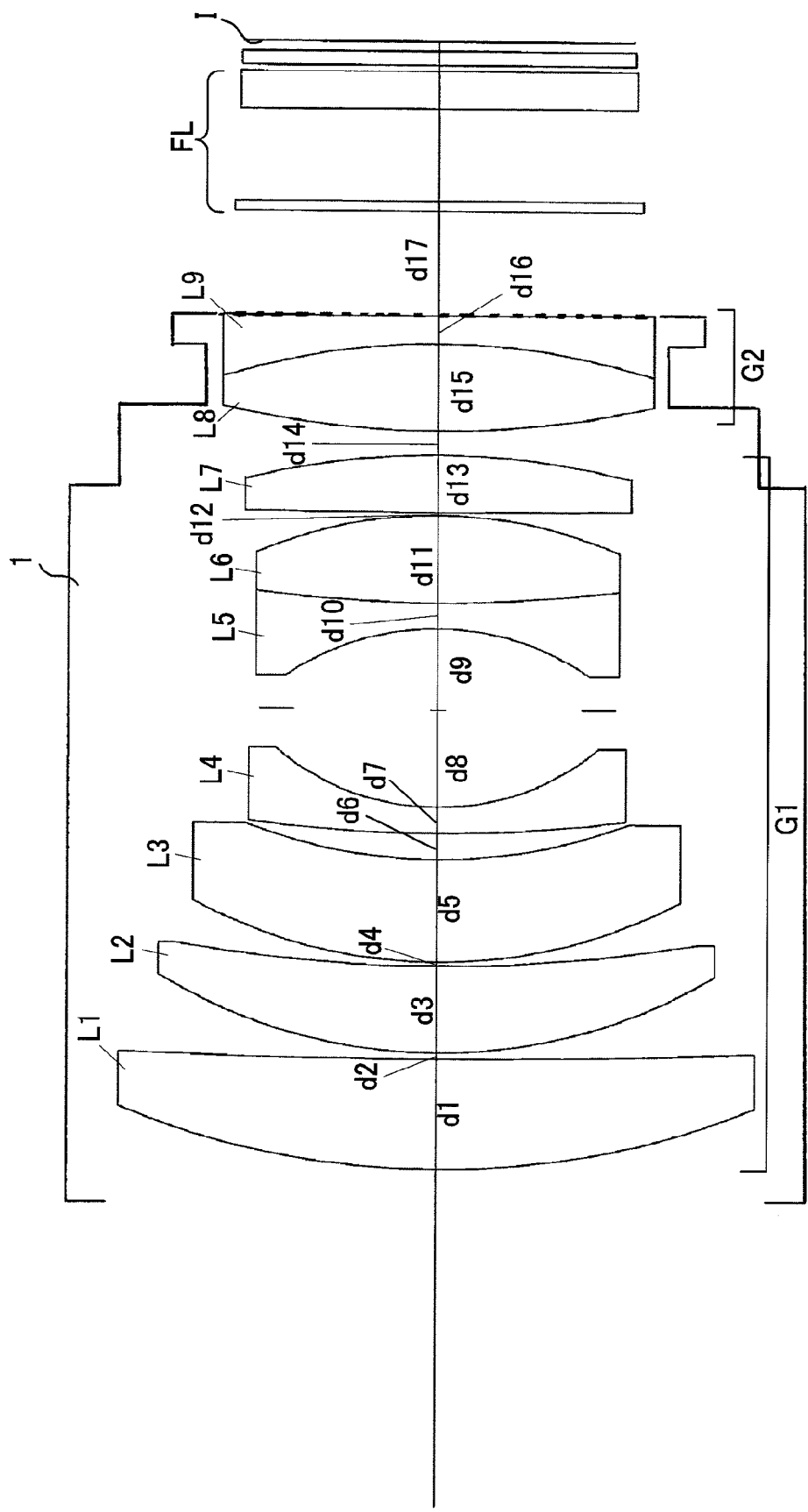
FIG. 6 shows a sectional view showing the structure of an interchangeable lens that incorporates a lens mount portion according to a fourth embodiment.

FIG. 6 is a figure showing the structure of an image capture lens system according to a fourth embodiment of the present invention. The optical system of this interchangeable lens 1 of FIG. 6 is a single focus lens incorporating a first lens group G1 and a second lens group G2.

The first lens group G1 includes a first lens component L1 that is a positive meniscus lens whose convex surface faces the object to be photographed, a second lens component L2 that is a positive meniscus lens whose convex surface faces the object to be photographed, a third lens component L3 that is a positive meniscus lens whose convex surface faces the object to be photographed, a fourth lens component L4 that is a negative meniscus lens whose convex surface faces the object to be photographed, a cemented lens in which a fifth lens component L5 that is a biconcave lens and a sixth lens component L6 that is a biconvex lens are glued together, and a seventh lens component L7 that is a biconvex lens.

And the second lens group G2 includes a cemented lens in which an eighth lens component L8 that is a biconvex lens and a ninth lens component L9 that is a biconcave lens are glued together.

Furthermore, a filter group FL includes a low pass filter and an infra-red cutoff filter and so on.

Moreover, an aperture stop S is provided within the first lens group G1, and is movable together with the first lens group G1 during focusing from the infinity state to the close-up state.

The values specified in this fourth embodiment of the present invention are displayed in the following Table 12. In Table 12, f is the focal length, F-number is the F number, and 2ω is the field angle. Moreover, the surface number is the number in order of the lens surface from the object to be photographed along the direction of travelling of the light rays, while the refractive index and the Abbe number are the values for d line (λ=587.6 nm). Here, while the units used in the specification values below for focal length f, radius of curvature r, and surface gap d are in general "mm", this is not to be considered as being limitative, since the optical system will provide the same optical performance even if its overall size is proportionally increased or decreased. It should be understood that a radius of curvature of 0.0000 denotes a plane, and that the refractive index of air is omitted since it is 1.00000.

TABLE 12 f = 32.00
F-number = 1.23
2ω = 29.36
image height = 8.35
total length = 56.12
air conversion length Bf = 12.63

| surface number | radius of curvature | surface gap | refractive index | Abbe number |
|---|---|---|---|---|
| 1 | 35.1646 | 5.50 | 1.59319 | 67.87 |
| 2 | 329.7297 | 0.30 | | |
| 3 | 22.4968 | 4.30 | 1.59319 | 67.87 |
| 4 | 61.9156 | 0.20 | | |
| 5 | 21.5844 | 5.10 | 1.81600 | 46.62 |
| 6 | 21.8900 | 1.30 | | |
| 7 | 57.6030 | 1.30 | 1.67270 | 32.10 |
| 8 | 10.5222 | 4.90 | | |
| 9 | 0.0000 | 4.00 | | (aperture stop S) |
| 10 | −11.2286 | 1.30 | 1.69895 | 30.13 |
| 11 | 56.3405 | 4.35 | 1.88300 | 40.76 |
| 12 | −19.0163 | 0.15 | | |
| 13 | 583.7537 | 2.85 | 1.75500 | 52.32 |
| 14 | −32.8762 | (d14) | | |
| 15 | 40.5457 | 4.30 | 1.88300 | 40.76 |
| 16 | −30.1051 | 1.40 | 1.76182 | 26.52 |
| 17 | 881.0656 | (d17) | | |
| 18 | 0.0000 | 0.50 | 1.51680 | 64.10 |
| 19 | 0.0000 | 4.60 | | |
| 20 | 0.0000 | 1.87 | 1.51680 | 64.10 |
| 21 | 0.0000 | 0.30 | | |
| 22 | 0.0000 | 0.70 | 1.51680 | 64.10 |
| 23 | 0.0000 | 0.50 | | |

| focal length of each lens group | | |
|---|---|---|
| group | first surface | focal length |
| 1 | 1 | 51.8852 |
| 2 | 15 | 40.3248 |

In this fourth embodiment of the present invention, the air gap d14 on the optical axis between the first lens group G1 and the second lens group G2 and the air gap d17 on the optical axis between the second lens group G2 and the filter group FL are changed during focusing. These variable gaps during the infinity focused state and the close-up focused state are shown in the following Table 13. It should be understood that the close-up distance is a photographic distance of 0.5 m.

TABLE 13

| | infinity focused state | close-up focused state |
|---|---|---|
| d14 | 1.2000 | 3.2351 |
| d17 | 5.2048 | 6.8141 |

The values corresponding to each of the conditional expressions in this fourth embodiment of the present invention are shown in the following Table (14).

TABLE 14 da = 18.0000
TLw = 56.1248
Σdw = 42.4500
Ymax = 8.3500
F-number = 1.2344
Conditional Expression #1 2rM = 30.0
Conditional Expression #2 da = 18.0
Conditional Expression #2-2 dB = 16.9540
Conditional Expression #3 D = 16.7000
Conditional Expression #4 L = 4.3252
Conditional Expression #5 (2rM/da = 1.6667) 1.6667 ≥ 1/1.2344
Conditional Expression #5-2 (2rM/dB = 1.7695) 1.7695 ≥ 1/1.2344

—The Fifth Embodiment—

FIG. 7 is a figure showing the structure of an image capture lens system according to a fifth embodiment of the present invention. The optical system of this interchangeable lens 1 of FIG. 7 is a zoom lens of a two-group structure incorporating a first lens group G1 and a second lens group G2, and furthermore the second lens group G2 incorporates a 2a-th lens group G2a and a 2b-th lens group G2b.

The first lens group G1 includes a first lens component L1 that is a negative meniscus lens whose convex surface faces towards the object to be photographed, a second lens component L2 that is a biconcave lens, and a third lens component L3 that is a positive meniscus lens whose convex surface faces towards the object to be photographed. The 2a-th lens group G2a is a fourth lens component that is a convex meniscus lens.

And the 2b-th lens group G2b includes a cemented lens in which a fifth lens component L5 that is a biconvex lens and a sixth lens component L6 that is a negative meniscus lens whose convex surface faces towards the image are glued together, a cemented lens in which a seventh lens component L7 that is a negative meniscus lens whose convex surface faces towards the object to be photographed and an eighth lens component L8 that is a biconvex lens are glued together, a ninth lens component L9 that is a positive meniscus lens whose convex surface faces the image, and a tenth lens component L10 that is a negative meniscus lens whose convex surface faces the image.

Furthermore, a filter group FL includes a low pass filter and an infra-red cutoff filter and so on. 101341 Moreover, an aperture stop S is disposed between the 2a-th lens group G2a and the 2b-th lens group G2b, and is fixed with respect to the image surface of the 2a-th lens group G2a or the 2b-th lens group G2b during focusing from the infinity state to the close-up state.

The values specified in this fifth embodiment of the present invention are displayed in the following Table 15. In Table 15, f is the focal length, F-number is the F number, and 2ω is the field angle. Moreover, the surface number is the number in order of the lens surface from the object to be photographed along the direction of travelling of the light rays, while the refractive index and the Abbe number are the values for d line (λ=587.6 nm). Here, while the units used in the specification values below for focal length f, radius of curvature r, and surface gap d are in general "mm", this is not to be considered as being limitative, since the optical system will provide the same optical performance even if its overall size is proportionally increased or decreased. It should be understood that a radius of curvature of 0.0000 denotes a plane, and that the refractive index of air is omitted since it is 1.00000.

In this fifth embodiment of the present invention, the lens surfaces for the first surface, the second surface, the fourth surface, and the nineteenth surface are formed as aspherical surfaces. The data for these aspherical surfaces, in other words the values of their vertex radiuses of curvature R, their conic constants κ, and their aspherical surface constants A4 through A10 are shown in the following Table 16.

TABLE 15-continued

| surface number | radius of curvature | surface gap | refractive index | Abbe number |
|---|---|---|---|---|
| *1 | 66.1237 | 1.90 | 1.76802 | 49.23 |
| *2 | 11.2811 | 10.60 | | |
| 3 | −42.1432 | 3.20 | 1.76802 | 49.23 |
| *4 | 17.4513 | 3.80 | | |
| 5 | 14.5546 | 2.40 | 1.92286 | 20.88 |
| 6 | 23.1839 | (d6) | | |
| 7 | 13.2265 | 1.50 | 1.75500 | 52.32 |
| 8 | 37.9949 | (d8) | | |
| 9 | 0.0000 | 1.50 | | (aperture stop S) |
| 10 | 21.7513 | 6.50 | 1.49782 | 82.56 |
| 11 | −9.3721 | 1.00 | 1.88300 | 40.77 |
| 12 | −49.7827 | 1.66 | | |
| 13 | 11.8579 | 1.20 | 1.90366 | 31.31 |
| 14 | 7.9982 | 2.50 | 1.49782 | 82.56 |
| 15 | −992.9794 | 1.21 | | |
| 16 | −5546.2137 | 1.80 | 1.49782 | 82.56 |
| 17 | −17.2843 | 0.40 | 1.00000 | |
| 18 | −13.7933 | 1.20 | 1.76802 | 49.23 |
| *19 | −21.3660 | (d19) | | |
| 20 | 0.0000 | 0.50 | 1.51633 | 64.14 |
| 21 | 0.0000 | 4.60 | | |
| 22 | 0.0000 | 1.87 | 1.51633 | 64.14 |
| 23 | 0.0000 | 0.30 | | |
| 24 | 0.0000 | 0.70 | 1.51633 | 64.14 |
| 25 | 0.0000 | 0.50 | | | focal length of each lens group

| group | first surface | focal length |
|---|---|---|
| 1 | 1 | −9.4458 |
| 2 | 7 | 16.6813 |

TABLE 16

| R | κ | A4 | A6 | A8 | A10 |
|---|---|---|---|---|---|
| The first surface | | | | | |
| 66.1237 | +11.2700 | $+6.5215 \times 10^{-6}$ | $+4.5152 \times 10^{-9}$ | +0.0000 | +0.0000 |
| The second surface | | | | | |
| 11.2811 | −0.6593 | +0.0000 | +0.0000 | +0.0000 | +0.0000 |
| The fourth surface | | | | | |
| 17.4513 | +2.7400 | $+1.5435 \times 10^{-4}$ | $+3.8190 \times 10^{-7}$ | +0.0000 | +0.0000 |
| The nineteenth surface | | | | | |
| −21.3661 | −21.6872 | $-1.3545 \times 10^{-4}$ | $+5.0740 \times 10^{-6}$ | $-6.2302 \times 10^{-8}$ | +0.0000 |

TABLE 15

| | wide angle end | intermediate focal length | telephoto end |
|---|---|---|---|
| f = | 6.90~ | 9.50~ | 12.61 |
| F-number = | 3.63~ | 4.53~ | 5.77 |
| 2ω = | 98.32~ | 78.98~ | 63.34 |
| image height = | 7.85~ | 7.85~ | 7.85 |
| lens total length = | 71.57~ | 69.91~ | 71.31 |
| air conversion length Bf = | 14.66~ | 19.25~ | 24.74 |

In this fifth embodiment of the present invention, the air gap d6 on the optical axis between the first lens group G1 and the second lens group G2, the air gap d8 on the optical axis between the 2a-th lens group G1a and the aperture stop S, and the air gap d19 on the optical axis between the second lens group G2 and the filter group FL are changed during zooming. The variable gaps during focusing at infinity when the focal length is set to the wide angle end state, the intermediate focal length state, and the telephoto end state are shown in the following Table 17.

TABLE 17

|  | wide angle end | intermediate focal length | telephoto end |
|---|---|---|---|
| f | 6.9000 | 9.5000 | 12.6100 |
| d6 | 12.1174 | 5.8676 | 1.7770 |
| d8 | 1.3806 | 1.3806 | 1.3806 |
| d19 | 7.2339 | 11.8255 | 17.3178 |

The values corresponding to each of the conditional expressions in this fifth embodiment of the present invention are shown in the following Table 18.

TABLE 18 da = 17.5000
TLw = 71.5698
Σdw = 55.8659
Ymax = 7.8500
F-number w = 3.6257
F-number m = 4.5272
F-number t = 5.7719
Conditional Expression #1 2rM = 21.8
Conditional Expression #2 da = 17.50
Conditional Expression #2-2 dB = 16.4540
Conditional Expression #3 D = 15.7000
Conditional Expression #4 L = 1.7961 (wide angle end)
Conditional Expression #5 (2rM/da = 1.2457) 1.2457 ≥ 1/3.6257, 1/4.5272, 1/5.7719
Conditional Expression #5-2 (2rM/dB = 1.3249) 1.3249 ≥ 1/3.6257, 1/4.5272, 1/5.7719

In the following, for the above first through fifth embodiments, the values of Conditional Expression #1 through Conditional Expression #6 are shown all together. Here, the symbol "○" is shown when Conditional Expression #5 is satisfied.

| | Conditional Expressions | | | | | |
|---|---|---|---|---|---|---|
| | #1 2rM | #2 da | #3 D | #4 L | #5 2rM/da ≥ 1/F-number | #6 2rM/da |
| first embodiment | 27.0 | 18.0 | 15.92 | −3.2252 | ○ | 1.50 |
| second embodiment | 33.0 | 17.0 | 17.00 | −5.7885 | ○ | 1.9412 |
| third embodiment | 18.0 | 18.5 | 16.38 | 2.5765 | ○ | 0.9730 |
| fourth embodiment | 30.0 | 18.0 | 16.70 | 4.3252 | ○ | 1.6667 |
| fifth embodiment | 21.8 | 17.5 | 15.70 | 1.7961 | ○ | 1.2457 |

It is preferable that the lens mount forming in the present invention is done by various process, e.g. machining as lathe turning or other cutting process, die-casting, injection molding and the like.

It should be understood that the present invention is not to be considered as being limited in any way by the structures described above with respect to the disclosed embodiments, provided that the essential technical functions of the present invention are not lost. Moreover, it would also be acceptable to arrange to combine the above described embodiments and variant embodiments thereof.

What is claimed is:

1. A camera system having a predetermined image circle, comprising:
an interchangeable lens having a lens mount portion for attachment to a camera body and that is capable of forming an image within that image circle; and
a camera body having an image sensor that is disposed within that image circle, and a body mount portion for attaching an interchangeable lens so that it is disposed at a position separated by a predetermined distance from a light reception surface of the image sensor,
wherein, when a radius of circular portion at a maximum internal diameter part of an opening portion of the lens mount portion is termed rM, a flange back that is a distance from the lens mount portion to the light reception surface of the image sensor in a state that the interchangeable lens and the camera body are mutually engaged is termed da, and a diameter of the image circle is termed D, a distance upon the optical axis from the lens mount portion to the lens surface closest to the image is termed L (with the lens mount portion taken as a reference, the direction towards the image being considered positive and the direction towards the object to be photographed being considered negative), and the aperture ratio of the optical system of the interchangeable lens capable to be attached to the camera body mount portion is termed F-number, the following conditional expressions are satisfied:

$18.0\ mm \leq 2rM \leq 34.0\ mm$     Conditional Expression #1

$18.0\ mm \leq da \leq 19.0\ mm$     Conditional Expression #2

$14.0\ mm \leq D \leq 20.0\ mm$     Conditional Expression #3

$-140.0\ mm \leq L \leq 11.0\ mm$     Conditional Expression #4

$2rM/da \geq 1/F\text{-number}$     Conditional Expression #5

$2rM/da \geq 0.8$     Conditional Expression #6A.

2. The camera system according to claim 1, wherein, when the maximum internal diameter part of the opening portion of the lens mount portion is termed rM, the flange back that is the distance upon the optical axis from the body mount portion to the light reception surface of the image sensor in a state that the interchangeable lens and the camera body are mutually engaged is termed da, the following conditional expression is satisfied:

$2rM/da \geq 1.0$     Conditional Expression #6B.

3. The camera system according to claim 1, wherein, when a diameter of the image circle is termed D, the following conditional expression is satisfied:

$14.0\ mm \leq D \leq 17.5\ mm$     Conditional Expression #3A.

4. The camera system according to claim 1, wherein, when a diameter of the image circle is termed D, the following conditional expression is satisfied:

$15.5\ mm \leq D \leq 17.5\ mm$     Conditional Expression #3B.

5. An interchangeable lens comprising:
a lens mount portion for attachment to a camera body; and
an optical system for focusing an object image on a light reception plane of an image sensor;
wherein, the interchangeable lens is adapted to be attached to the camera body that has a camera body mount portion and the image sensor whose whole pixels generate imaging signals can fit inside of a circle having a diameter in a range from 14.0 mm to 20.0 mm, and,
when a maximum internal diameter part of an opening portion of the lens mount portion is termed rM and a flange back that is a distance upon the optical axis from the body mount portion to the light reception surface of the image sensor in a state that the interchangeable lens and the camera body are mutually engaged is termed da, a distance upon the optical axis from the lens mount portion to the lens surface closest to the image is termed L (with the lens mount portion taken as a reference, the direction towards the image being considered positive and the direction towards the object to be photographed being considered negative), and the aperture ratio of the optical system of the interchangeable lens capable to be attached to the camera body mount portion is termed F-number, the following conditional expressions are satisfied:

| | |
|---|---|
| 18.0 mm≤2rM≤34.0 mm | Conditional Expression #1 |
| 18.0 mm≤da≤19.0 mm | Conditional Expression #2 |
| −140.0 mm≤L≤11.0 mm | Conditional Expression #4 |
| 2rM/da≥1/F-number | Conditional Expression #5 |
| 2rM/da≥0.8 | Conditional Expression #6A. |

6. The interchangeable lens according to claim 5, wherein, when the maximum internal diameter part of the opening portion of the lens mount portion is termed rM, the flange back that is the distance upon the optical axis from the body mount portion to the light reception surface of the image sensor in a state that the interchangeable lens and the camera body are mutually engaged is termed da, the following conditional expression is satisfied:

| | |
|---|---|
| 2rM/da≥1.0 | Conditional Expression #6B. |

7. An interchangeable lens comprising:
a lens mount portion for attachment to a camera body; and
an optical system for focusing an object image on a light reception plane of an image sensor;
wherein, the interchangeable lens is adapted to be attached to the camera body that has a camera body mount portion and the image sensor whose whole pixels generate imaging signals can fit inside of a circle having a diameter in a range from 14.0 mm to 17.5 mm, and,
when a maximum internal diameter part of an opening portion of the lens mount portion is termed rM and a flange back that is a distance upon the optical axis from the body mount portion to the light reception surface of the image sensor in a state that the interchangeable lens and the camera body are mutually engaged is termed da, a distance upon the optical axis from the lens mount portion to the lens surface closest to the image is termed L (with the lens mount portion taken as a reference, the direction towards the image being considered positive and the direction towards the object to be photographed being considered negative), and the aperture ratio of the optical system of the interchangeable lens capable to be attached to the camera body mount portion is termed F-number, the following conditional expressions are satisfied:

| | |
|---|---|
| 18.0 mm≤2rM≤34.0 mm | Conditional Expression #1 |
| 18.0 mm≤da≤19.0 mm | Conditional Expression #2 |
| −140.0 mm≤L≤11.0 mm | Conditional Expression #4 |
| 2rM/da≥1/F-number | Conditional Expression #5 |
| 2rM/da≥0.8 | Conditional Expression #6A. |

8. An interchangeable lens comprising:
a lens mount portion for attachment to a camera body; and
an optical system for focusing an object image on a light reception plane of an image sensor;
wherein, the interchangeable lens is adapted to be attached to the camera body that has a camera body mount portion and the image sensor whose whole pixels generate imaging signals can fit inside of a circle having a diameter in a range from 15.5 mm to 17.5 mm, and,
when a maximum internal diameter part of an opening portion of the lens mount portion is termed rM and a flange back that is a distance upon the optical axis from the body mount portion to the light reception surface of the image sensor in a state that the interchangeable lens and the camera body are mutually engaged is termed da, a distance upon the optical axis from the lens mount portion to the lens surface closest to the image is termed L (with the lens mount portion taken as a reference, the direction towards the image being considered positive and the direction towards the object to be photographed being considered negative), and the aperture ratio of the optical system of the interchangeable lens capable to be attached to the camera body mount portion is termed F-number, the following conditional expressions are satisfied:

| | |
|---|---|
| 18.0 mm≤2rM≤34.0 mm | Conditional Expression #1 |
| 18.0 mm≤da≤19.0 mm | Conditional Expression #2 |
| −140.0 mm≤L≤11.0 mm | Conditional Expression #4 |
| 2rM/da≥1/F-number | Conditional Expression #5 |
| 2rM/da≥0.8 | Conditional Expression #6A. |

* * * * *